3,277,106
TETRAHYDRONAPHTHALENE AND BENZO-
SUBERANE COMPOUNDS
William Laszlo Bencze, New Providence, and Charles
Ferdinand Huebner, Chatham, N.J., assignors to Ciba
Corporation, New York, N.Y., a corporation of Delaware
No Drawing. Filed Dec. 8, 1965, Ser. No. 512,514
13 Claims. (Cl. 260—295)

This is a continuation-in-part of application Ser. No. 411,632, filed November 16, 1964, now abandoned, which in turn is a continuation-in-part of application Ser. No. 351,842, filed March 13, 1964, which in turn is a continuation-in-part of application Ser. No. 339,578, filed January 23, 1964, which in turn is a continuation-in-part of application Ser. No. 222,627, filed September 10, 1962, now Patent No. 3,234,090, which in turn is a continuation-in-part of application Ser. No. 160,291, filed December 18, 1961, now abandoned.

The present invention concerns basic ethers. More particularly, it relates to 1,2,3,4-tetrahydro-naphthalene and benzosuberane compounds of the Formula I:

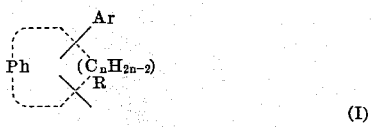

in which Ph is a 1,2-phenylene radical, Ar is a monocyclic aryl radical substituted by at least one amino-lower alkyl-oxy group in which the nitrogen atom is separated from the oxygen atom by at least two carbon atoms, R is an aryl radical, and the portion —($C_nH_{2n-2}$)— stands for lower alkylene forming with Ph a six- or seven-membered ring, two of the ring carbon atoms thereof carry the groups Ar and R, salts, N-oxides, salts of N-oxides and quaternary ammonium compounds thereof, as well as methods for their preparation.

The 1,2-phenylene (o-phenylene) radical Ph is unsubstituted or may be substituted by one or more than one of the same or of different substituents attached to any of the four positions available for substitution. Such substituents are primarily the following: lower alkyl, e.g. methyl, ethyl, n- or i-propyl, etherified hydroxy, especially lower alkoxy, e.g. methoxy, ethoxy, n- or i-propoxy or n-butoxy, lower alkenyloxy, e.g. allyloxy, lower alkylenedioxy, e.g. methylenedioxy, esterified hydroxy, particularly halogeno, e.g. fluoro, chloro or bromo, trifluoromethyl, nitro, unsubstituted or substituted amino, such as dilower alkyl-amino, e.g. dimethylamino or diethylamino, acyl, such as lower alkanoyl, e.g. acetyl, propionyl or pivalyl, benzoyl or pyridoyl, e.g. nicotinoyl. Above all the 1,2-phenylene radical Ph stands for 1,2-phenylene, (lower alkyl)-1,2-phenylene, (lower alkoxy)-1,2-phenylene, (lower alkenyl-oxy)-1,2-phenylene, (lower alkylenedioxy)-1,2-phenylene, (halogeno)-1,2-phenylene, (trifluoromethyl)-1,2-phenylene, (nitro)-1,2-phenylene, (amino)-1,2-phenylene, (dilower alkylamino)-1,2-phenylene, (lower alkanoyl)-1,2-phenylene, (benzoyl)-1,2-phenylene or (pyridoyl)-1,2-phenylene.

The lower alkylene group —($C_nH_{2n-2}$)— substituting the two adjacent positions 1 and 2 of the phenylene radical Ph may be unbranched or branched and has preferably from four to seven carbon atoms, four or five of which form the ring chain which carries the aryl radicals Ar and R. Accordingly, the letter n in the above group stands preferably for one of the integers 4, 5, 6 and 7. Above all two adjacent ring carbon atoms of the group —($C_nH_{2n-2}$)—, one of which is preferably adjacent to the 1,2-phenylene radical, carry the radicals Ar and R. The alkylene group, for example, represents 1,4-butylene, 1,4-(or 2,5-) pentylene, 2-methyl-1,4-butylene (or 3-methyl-1,4-butylene), 3-methyl-1,4-pentylene (or 3-methyl-2,5-pentylene), 2,3 - dimethyl-1,4-butylene, 1,4 - (or 3,6-) hexylene, 2-ethyl-1,4-butylene (or 3-ethyl-1,4-butylene), 1,5-pentylene, 1,5- (or 2,6-) hexylene or 2-methyl-1,5-pentylene (or 4-methyl-1,5-pentylene).

The monocyclic aryl radical Ar contains one or more than one amino-lower alkoxy substituent, which may substitute any of the positions available for substitution. It is preferably a monocyclic carbocyclic aryl radical which, beside the amino-lower alkoxy substituent(s), may contain one or more than one additional substituents, which may be attached to any of the positions available for substitution. Such substituents are represented by lower alkyl, e.g. methyl, ethyl or isopropyl, halogeno, e.g. fluoro, chloro or bromo or halogeno-lower alkyl, e.g. trifluoromethyl. An amino-lower alkyl-oxy group may be represented by the formula Am—($C_mH_{2m}$)—O— in which the letter m is preferably an integer from two to seven, more especially an integer from two to three. The portion —($C_mH_{2m}$)— above all stands for 1,2-ethylene, but also for 1,2-, 2,3- or 1,3-propylene, 1,3-, 2,3-, 3,4- or 1,4-butylene, 1,4- or 1,5-pentylene, 1,5- or 1,6-hexylene or 1,7-heptylene.

In the above formula the amino group Am stands for a primary, secondary or preferably a tertiary amino group. Substituents in the secondary or tertiary amino group are, for example, aliphatic radicals, such as lower alkyl or lower alkenyl, e.g. methyl, ethyl, propyl, isopropyl, butyl, isobutyl, secondary butyl, pentyl, or neopentyl; allyl or 2-methylallyl, cycloaliphatic radicals, such as cycloalkyl, or cycloaliphatic-aliphatic radicals, such as cycloalkyl-lower alkyl, especially those having from three to seven, preferably from five to six, ring carbon atoms, e.g. cyclopentyl or cyclohexyl; cyclopentylmethyl or 2-cyclohexylethyl, carbocyclic aryl radicals, such as monocyclic carbocyclic aryl, e.g. phenyl or carbocyclic aryl-aliphatic radicals, such as monocyclic carbocyclic aryl-lower alkyl, e.g. benzyl, 1-phenylethyl or 2-phenylethyl.

Substituted amino groups Am are primarily mono- or dilower alkyl-amino groups, in which lower alkyl has preferably from one to four carbon atoms, e.g. methyl-amino, dimethylamino, N-methyl-N-ethylamino, ethylamino, diethylamino, n-propylamino, di-n-propylamino, isopropylamino, di-isopropylamino, n-butylamino or di-n-butylamino, cycloalkylamino or N-cycloalkyl-N-lower alkylamino, in which cycloalkyl has preferably from five to six ring carbon atoms and lower alkyl has preferably from one to four carbon atoms, e.g. cyclopentylamino, cyclohexylamino, N - cyclopentyl - N - methyl - amino, N-cyclohexyl - N - methyl - amino or N-cyclohexyl-N-ethyl-amino, phenyl-lower alkyl-amino or N-lower alkyl-N-phenyl-lower alkyl-amino, in which lower alkyl has preferably from one to four carbon atoms, e.g. benzylamino, N-benzyl-N-methyl-amino, N-benzyl-N-ethyl-amino, N-ethyl-N-(1-phenylethyl)-amino or N-methyl-N-(2-phenylethyl)-amino. The above substituents, particularly lower alkyl, may also carry functional groups, such as hydroxyl, lower alkoxy, e.g. methoxy or ethoxy or lower alkyl-mercapto, e.g. methylmercapto or ethylmercapto. Substituted-amino groups, in which the substituents carry functional groups, are, for example, hydroxy-lower alkyl-amino, N-(hydroxy-lower alkyl)-N-lower alkyl-amino or di-(hydroxy-lower alkyl)-amino, in which hydroxyl is separated from the amino-nitrogen by at least two, preferably by two to three, carbon atoms, e.g. 2-hydroxyethyl-amino, N-(2-hydroxyethyl)-N-methyl-amino or di-(2-hydroxyethyl)-amino.

A tertiary amino group Am may also represent alkylene-imino, in which alkylene has from four to eight carbon atoms, such as pyrrolidino groups, e.g. pyrrolidino or 2-methyl-pyrrolidino, piperidino groups, e.g. piperidino, 2- methyl-piperidino, 4-methyl-piperidino, 3-hydroxy-piperidino, 3-acetoxy-piperidino or 3-hydroxymethyl-piperidino; 1,6-hexyleneimino or 1,7-heptyleneimino; aza-alkyleneimino groups or particularly N-lower alkyl-aza-alkyleneimino groups, in which alkylene has from four to six carbon atoms and the two nitrogen atoms are separated by at least two carbon atoms, such as piperazino or particularly, 4-lower alkyl-piperazino, e.g. 4-methyl-piperazino or 4-ethyl-piperazino, as well as 4-hydroxyethyl-piperazino or 4-acetoxyethyl-piperazino 3-aza-1,6-hexyleneimido, particularly 3-aza-3-lower alkyl-1,6-hexyleneimino, e.g. 3-aza-3-methyl-1,6-hexyleneimino, 4-aza-1,7-heptyleneimino, particularly 4-aza-4-lower alkyl-1,7-heptyleneimino, e.g. 4-aza-4-methyl-1,7-heptyleneimino, oxa-alkyleneimino or thia-alkyleneimino in which alkylene has preferably four carbon atoms, and the oxygen or sulfur atom is separated from the nitrogen atom by two carbon atoms, such as morpholino or thiamorpholino groups, e.g. morpholino, 3-methyl-morpholino or thiamorpholino.

In the amino-lower alkyl-oxy group, the lower alkyl portion, either partially or in toto, may also form part of a saturated heterocyclic ring system, of which the amino group is a ring member and is separated from the oxygen atom by at least two carbon atoms. Such amino-lower alkyl-oxy groups are, for example, piperidyl-(2) or (3)-methoxy, piperidyl-(4)-oxy, pyrrollidyl-(3)-oxy, 1-methyl-piperidyl-(2) or (3)-methoxy, 1-ethyl-piperidyl-(4)-oxy or 1-methyl-pyrrolidyl-(3)-oxy.

The aryl group R in the first formula preferably is a carbocyclic aryl radical, particularly a monocyclic carbocyclic aryl radical, which may be unsubstituted or may contain one or more than one of the same or of different substituents attached to any of the positions available for substitution. Such substituents are primarily the following: lower alkyl, or lower alkoxy, preferably such with one to four carbon atoms, e.g. methyl, ethyl, n-propyl, isopropyl or n-butyl; methoxy, ethoxy, n-propyloxy, isopropyloxy or n-butyloxy, halogeno, e.g. fluoro, chloro or bromo, nitro, amino, di-lower alkyl-amino in which lower alkyl has preferably from one to four carbon atoms, e.g. dimethylamino, N-ethyl-N-methyl-amino, or diethylamino, trifluoromethyl or the group Am—($C_mH_{2m}$)—O— with the previously-given meaning. The aryl radical representing R may also be a heterocyclic aryl radical, particularly a monocyclic heterocyclic aryl radical, such as pyridyl, e.g. 3-pyridyl or 4-pyridyl.

Salts of the compounds of this invention are acid addition salts, especially pharmaceutically acceptable acid addition salts with inorganic acids, e.g. hydrochloric, hydrobromic, sulfuric or phosphoric acid or organic acids, such as carboxylic acids, e.g. acetic, propionic, pivalic, glycolic, lactic, malonic, succinic, maleic, hydroxy-maleic, malic, tartaric, citric, benzoic, salicylic, 2-acetoxybenzoic, nicotinic or isonicotinic acid, or sulfonic acids, e.g. methane sulfonic, ethane sulfonic, ethane 1,2-disulfonic, 2-hydroxy-ethane sulfonic, p-toluene sulfonic or naphthalene 2-sulfonic acid. Other addition salts with acids may be useful as intermediates, for example, in the preparation of pharmaceutically acceptable, non-toxic acid addition salts or in the purification of the free compounds, as well as for identification or characterization purposes. Salts, which are prepared primarily for the latter, are, for example, those with acidic organic nitro compounds, e.g. picric, picrolonic or flavianic acid or metal complex acids, e.g. phosphotungstic, phosphomolybdic, chloroplatinic or Reinecke acid. Mono- or poly-salts may be formed depending on the number of salt-forming groups and/or the conditions used for the salt formation.

Also included within the scope of the present invention are the N-oxides of the aforementioned compounds, as well as the acid addition salts of such N-oxides, for example, the pharmaceutically acceptable, non-toxic acid addition salts of N-oxides, such as those with the above-mentioned acids.

Quaternary ammonium compounds of the compounds of this invention are those formed with reactive esters of alcohols and strong inorganic or organic acids, particularly those with lower aliphatic halides, sulfates, or sulfonates, such as lower alkyl halides, e.g., methyl, ethyl, n-propyl or isopropyl chloride, bromide or iodide, di-lower alkyl sulfates, e.g., dimethyl sulfate or diethyl sulfate, lower alkyl lower alkane sulfonates, e.g., ethyl or methyl methane sulfonate or ethane sulfonate, lower alkyl lower hydroxy-alkane sulfonates, e.g., methyl 2-hydroxy-ethane sulfonate, or lower alkyl monocyclic carbocyclic aryl sulfonates, e.g., methyl p-toluene sulfonate or ethyl p-toluene sulfonate, as well as those with carbocyclic aryl-aliphatic halides, such as phenyl-lower alkyl halides, e.g., benzyl, 1-phenylethyl or 2-phenylethyl chloride, bromide or iodide. Also included as quaternary ammonium compounds are the corresponding quaternary ammonium hydroxides and the quaternary ammonium salts with acids other than hydrohalic, sulfuric or organic sulfonic acids, particularly those with the carboxylic acids mentioned hereinabove.

The compounds of the invention exhibit valuable pharmacological properties. For example, they show estrogenic, hypocholesterolemic and antifertility effects, as can be demonstrated in animal tests using, for example, rats as test objects. The new compounds are, therefore, useful as estrogenic agents, for example in the treatment of animals to increase weight gain or efficiency of feed utilization, as hypocholesterolemic agents, preferably in the treatment of arteriosclerosis and as antifertility agents preventing pregnancy by inhibition of the eggs nidation.

In addition, the compounds of this invention have antifungal properties; for example, they show antidermatophyte effects against fungi causing superficial dermatophytoses, such as *Trichophyton mentagrophytes, Trichophyton gallinae, Trichophyton interdigitale, Microsporum audouini, Microsporum canis* or *Microsporum gypseum* and are, therefore, useful in the treatment of infections caused by such micro-organisms, particularly of topical fungal infections of the skin, such as dermatophytosis (athlete's foot). They also have antifungal effects against fungi causing chronic infections of the skin and the subcutaneous tissue, such as *Sporotrichium schenkii*, or fungi causing deep-seated systemic mycoses (yeasts), such as *Candida albicans, Cryptococcus neoformans* or *Histoplasma capsulatum* and are useful in the treatment of infections caused by such micro-organisms.

Furthermore, the compounds of this invention are active against actinomyces, such as *Nocardia asteroides* against bacteria, such as gram-positive bacteria, for example, *Diplococcus pneumoniae* or *Staphylococcus aureus* or gram-negative bacteria, for example, *Escherichia coli* or *Pseudomonas aeruginosa* and against protozoa, such as *Trichomonas vaginalis*. They are, therefore, useful in the treatment of infections caused by such actinomyces, bacteria and protozoa of the above type.

Compounds of this invention, especially those having more than one amino-lower alkoxy group substituting the radical Ar, also have taeniacidal (anti-tapeworm) properties, and are, therefore, useful as taeniacides in the treatment of tapeworm infections, caused, for example, by *Hymenolepas nana, Dypilidium canium* or *Taenia pisiformis*.

Particularly useful are the compounds having the Formula II:

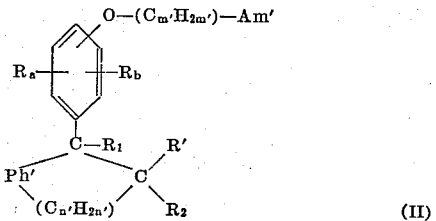

(II)

in which Ph' stands primarily for 1,2-phenylene, (lower alkyl)-1,2-phenylene, (lower alkoxy)-1,2-phenylene or (halogeno)-1,2-phenylene, R' is phenyl, (lower alkyl)- phenyl, (lower alkoxy)- phenyl or (halogeno)-phenyl, each of the groups $R_1$ and $R_2$ is hydrogen, methyl or ethyl, the portion —$(C_{n'}H_{2n'})$— stands for alkylene having from two to three carbon atoms and separating the group Ph′ from the carbon atom carrying the groups R′ and $R_2$ by two to three carbon atoms, Am′ stands for amino, lower alkyl-amino, di-lower alkyl-amino, alkyleneimino in which alkylene has from four to seven carbon atoms, 4-morpholino or 4-lower alkyl-piperazino, the portion —$(C_m·H_{2m'})$— stands for alkylene having from two to three carbon atoms and separating the group Am′ from the oxygen atom by two to three carbon atoms, and each of the groups $R_a$ and $R_b$ is hydrogen or halogeno, an N-oxide, a quaternary ammonium salt and an acid addition salt thereof. In the above compounds, the group of the formula —O—$(C_m·H_{2m'})$—Am′ preferably substitutes the 4-position of the phenyl group.

Especially valuable are compounds of the Formula III:

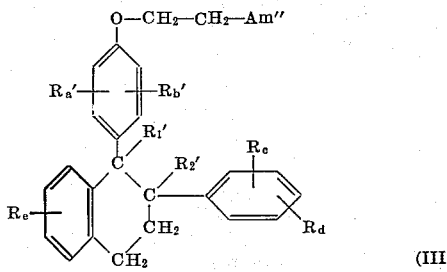

(III)

in which Am″ is N,N-di-lower alkyl-amino or N,N-alkylene-imino, in which alkylene has from four to seven carbon atoms, one of the groups $R_1'$ and $R_2'$ is hydrogen or methyl, and the other is hydrogen, each of the groups $R_a'$ and $R_b'$ is hydrogen or halogeno and each of the groups $R_c$, $R_d$ and $R_e$ is hydrogen, lower alkyl, lower alkoxy or halogeno, and acid addition salts, particularly pharmaceutically acceptable acid addition salts, thereof.

The compounds of the present invention are prepared according to methods known per se. For example, they can be obtained by:

(a) Converting in a compound of the Formula IV:

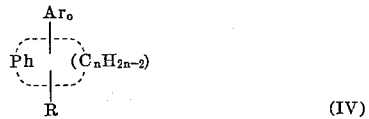

(IV)

in which Ph, R and portion —$(C_nH_{2n-2})$— have the previously-given meaning, and $Ar_0$ is a monocyclic aryl group substituted by at least one group $R_0$ which is a substituent capable of being converted into an amino-lower alkoxy group, in which the nitrogen atom is separated from the oxygen atom by at least two carbon atoms, or a salt thereof, the substituent $R_0$ into said amino-lower alkyl-oxy group, or (b) Replacing in a compound of the Formula V:

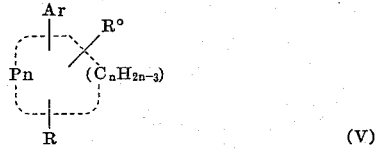

(V)

in which Ph, Ar and R have the previously-given meaning, R° is free or esterified hydroxyl, and the portion —$(C_nH_{2n-3})$— is lower alkylene forming with Ph a six- or seven-membered ring, two or three of the ring carbon atoms thereof carry the groups Ar, R and R°, or a salt thereof, the group R° by hydrogen, or (c) Hydrogenating in a compound of the Formula VI:

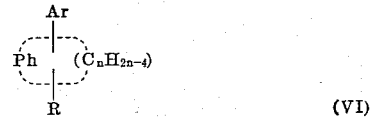

(VI)

in which Ph, Ar and R have the previously-given meaning, and the portion —$(C_nH_{2n-4})$— is lower alkenylene forming with Ph a six- or seven-membered ring, two of the ring carbon atoms thereof carry the groups Ar and R, or a salt thereof, the double bond in the lower alkylene portion, and, if desired, converting a resulting salt into the free compound or into another salt, and/or, if desired, converting a resulting compound into an N-oxide or a quaternary ammonium compound thereof, and/or, if desired, converting a resulting compound or an N-oxide into a salt thereof, and/or, if desired, converting a quaternary ammonium compound into another quaternary ammonium compound, and/or, if desired, separating a mixture of isomers into the single isomers.

In the starting material of the Formula IV, the group $Ar_0$ may have one or more than one group $R_0$, which is converted into amino-lower alkyl-oxy in one step or in stages. A particularly suitable group $R_0$ is hydroxyl. Its conversion into amino-lower alkyl-oxy is carried out according to known procedures. Usually, the starting material, in which $Ar_0$ is substituted by hydroxyl (the starting material, therefore, is a phenol), or preferably a salt thereof, is reacted with a reactive ester of an amino-lower alkanol, particularly a compound of the formula Am—$(C_mH_{2m})$—X, in which Am and the portion —$(C_mH_{2m})$— have the previously-given meaning, and X stands for a reactive esterified hydroxyl group. The latter is above all a hydroxyl group esterified with a strong mineral acid, such as a hydrohalic acid, e.g. hydrochloric or hydrobromic acid. Accordingly the group X represents primarily halogeno, e.g. chloro or bromo. It may also be a hydroxyl group esterified with a strong organic sulfonic acid, such as a lower alkane sulfonic acid, e.g. methane sulfonic or ethane sulfonic acid or a monocyclic carbocyclic aryl-sulfonic acid, e.g. p-toluene sulfonic acid.

As noted above, the starting material is preferably used in the form of a salt thereof. Such salt, for example, a metal salt, particularly an alkali metal salt, e.g. lithium salt, sodium salt or potassium salt, as well as an alkaline earth metal salt, or an other suitable salt, is formed, for example, by treatment of the phenol with a metal salt-forming reagent, such as an alkali metal hydride or amide, e.g. lithium hydride, sodium hydride, sodium amide or potassium amide or an alkali metal or alkaline earth metal lower alkoxide, e.g. lithium, sodium, potassium or barium methoxide, ethoxide or tertiary butoxide, an alkali metal compound of a hydrocarbon, e.g. butyl lithium, phenyl lithium or phenyl sodium. The preparation of the salts is usually carried out in the presence of an inert solvent, e.g. hexane, benzene, toluene, xylene, diethyl ether, p-dioxane, tetrahydrofuran, diethyleneglycol dimethylether or N,N-dimethylformamide or a lower alkanol, e.g. methanol or ethanol or a solvent mixture, if necessary, while cooling or at an elevated temperature, and/or in the atmosphere of an inert gas.

The reaction of the starting material, particularly in the form of a metal compound, with the reactive ester of an amino-lower alkanol is carried out in the presence of a suitable diluent, for example, in the solvent or solvent mixture used for the preparation of the metal compound, if necessary, while cooling or at an elevated temperature, and/or, in the atmosphere of an inert gas, e.g. nitrogen. Formation of the metal compound of the starting material may also be achieved in situ; for example, the free starting material and the reactive ester of the amino-lower alkanol may be reacted in the presence of a salt-forming reagent, such as an alkali metal carbonate.

The conversion of a hydroxyl group $R_0$ into the amino-lower alkyl-oxy group may also be achieved by treating the starting material with an amino lower alkanol in the presence of a disubstituted carbonate. The latter is, for example, a diaryl carbonate, e.g. diphenyl carbonate or, more particularly, a di-lower alkyl carbonate, e.g. dimethyl carbonate, ethyl methyl carbonate, diethyl carbonate or, dibutyl carbonate. The reaction is carried out at an elevated temperature, for example, between about 100° and about 210°, preferably between about 180° and about 200°, and, if desired, in the presence of a transesterification catalyst enhancing the rate of the reaction, e.g. sodium, potassium, sodium carbonate, potassium carbonate or sodium aluminate, a metal lower alkoxide, e.g. sodium ethoxide or titanium butoxide. The reaction is usually performed in the absence of an additional diluent, but may also be carried out in the presence of a further solvent or solvent mixture, if necessary, in a closed vessel and/or in the atmosphere of an inert gas, e.g. nitrogen.

Another group $R_o$ is that of the formula $$-O-C(=O)-Y$$

in which Y represents halogeno or etherified hydroxyl. The group Y is particularly lower alkoxy, e.g. methoxy, ethoxy or n-butyloxy, as well as phenyloxy, whereas halogeno, representing Y, is particularly chloro, as well as bromo. Upon reacting a starting material of the Formula IV, in which $Ar_o$ is substituted by such group $R_o$, with an amino-lower alkanol, the desired compound can also be formed. The reaction is carried out under the last mentioned conditions, i.e. at an elevated temperature, preferably between 180° and 200°, and, if desired, in the presence of a transesterification reagent, such as one of those previously-described; the reaction may be carried out in the presence of a solvent or solvent mixture, if necessary, in the atmosphere of an inert gas, e.g. nitrogen.

A further group $R_o$ is a reactive esterified hydroxy-alkoxy group. Here the reactive esterified hydroxy group is primarily halogeno, particularly chloro; it may also be an organic sulfonyloxy group, such as one of those mentioned above. A starting material in which $R_o$ stands for reactive esterified hydroxy-alkoxy is reacted with ammonia or a corresponding primary or secondary amine, to yield the desired compounds. The reaction is preferably carried out in such manner, that an excess of the ammonia or amine or of any other suitable base is present to neutralize the generated acid. A base, acting as acid-neutralizing agent, is for example, potassium carbonate. If desired, the reaction mixture is diluted with a suitable solvent or solvent mixture; if necessary, the reaction is carried out while cooling or at an elevated temperature, and/or in the atmosphere of an inert gas, e.g. nitrogen, and/or in a closed vessel.

Another group $R_o$ is a carbamyl lower-alkyl-oxy group. It can be reduced to the amino-lower alkyl-oxy group, for example, with the use of complex light metal hydrides, such as lithium aluminum hydride.

In the starting material of the Formula V the hydroxy group is preferably attached to the same carbon atom as the group Ar, especially if the latter substitutes one of the carbon atoms adjacent to the 1,2-phenylene radical. It may also be attached to the carbon atom carrying the group R, as well as to a branched carbon atom of the lower alkylene portion $-(C_nH_{2n-3})-$. It is replaced by hydrogen according to known methods, for example, by treating the starting material or an acid addition salt thereof with hydrogen in the presence of a catalyst, e.g. a platinum catalyst (for example, in the presence of methanol), Raney nickel and the like, if necessary, at an increased pressure and/or at an elevated temperature. It may also be removed by chemical reduction, for example, by treatment with zinc in the presence of an acid, e.g. hydrochloric acid or acetic acid, with a metal amalgam, e.g. sodium amalgam in the presence of a moist solvent, e.g. diethyl ether, or with a complex light metal hydride, e.g. lithium aluminum hydride preferably in the presence of aluminum chloride.

An esterified hydroxyl group representing R° in Formula V is primarily halogeno, e.g. chloro or bromo. It is removed either by catalytic hydrogenation or by chemical reduction, e.g. by treatment with zinc in the presence of an acid.

In the starting material of the Formula VI, the carbon atoms of the portion $-(C_nH_{2n-4})-$ which carry the groups Ar+R usually also carry the double bond, which is preferably in conjugation with the 1,2-phenylene radical. Its removal is carried out according to hydrogenation methods known per se, for example, by treatment with an alkali metal, e.g. sodium, in the presence of a lower alkanol, with a metal amalgam in the presence of a hydrogen donor, e.g. sodium amalgam in the presence of moist diethyl ether, or with catalytically activated hydrogen, such as hydrogen in the presence of a platinum catalyst, or any other suitable hydrogenation method, such as those mentioned above.

The final products are obtained in free form or in the form of their salts, depending on the conditions under which the process is carried out. A resulting salt is converted into the free base, for example, by treating it with an alkaline reagent, such as a metal hydroxide, e.g. lithium, sodium, potassium or calcium hydroxide, a metal carbonate, e.g. sodium, potassium or calcium carbonate or hydrogen carbonate, ammonia, or by treatment with a suitable hydroxyl ion exchange resin.

A resulting salt, particularly a salt with an inorganic acid, can be converted into another salt according to known methods, for example, by reacting it with a suitable metal, e.g. sodium, barium or silver salt of an acid, preferably in the presence of a diluent, in which a resulting inorganic salt is insoluble and is thus removed from the reaction mixture. A salt may also be converted into another salt by treating it with an anion exchange resin.

A free base is converted into an acid addition salt thereof according to known methods, for example, by reacting it or a solution thereof in a suitable solvent or solvent mixture, with the acid or a solution thereof, or with a suitable anion exchange resin and isolating the desired salt. A salt may be obtained in the form of a hydrate thereof or may include solvent of crystallization.

An N-oxide of the compounds of this invention is prepared according to known methods, for example, by treating the free base with a suitable N-oxidizing reagent, such as hydrogen peroxide, ozone or a peracid, e.g. peracetic, perbenzoic, monoperphthalic or persulfuric acid, in the presence of a suitable inert diluent. An N-oxide can be converted into a salt thereof according to the above procedure.

Quaternary ammonium derivatives of the compounds of this invention are obtained according to known methods, for example, by reacting the base with the reactive ester of an alcohol and a strong acid, such as, for example, with one of the lower alkyl halides, di-lower alkyl-sulfates, lower alkyl organic sulfonates or phenyl-lower alkyl halides described above. The quaternizing reaction is performed in the absence or presence of a solvent, while cooling or at an elevated temperature, if necessary, in a closed vessel and/or in the atmosphere of an inert gas, e.g. nitrogen.

Resulting quaternary ammonium compounds may be converted into other quaternary ammonium compounds, such as the quaternary ammonium hydroxides, for example, by reacting a quaternary ammonium halide with silver oxide, or a quaternary ammonium sulfate with barium hydroxide, by treating a quaternary ammonium salt with a hydroxyl ion exchange resin or by electrodialysis. A quaternary ammonium hydroxide is converted into a quaternary ammonium salt by reacting the former with a suitable acid. A quaternary ammonium salt can also be converted directly into another quaternary ammonium salt; for example, a quaternary ammonium iodide, when reacted with freshly prepared silver chloride or with hydrochloric acid in anhydrous methanol, yields the desired quaternary ammonium chloride, or a quaternary ammonium salt when treated with a suitable anion exchange resin, can be converted into another quaternary ammonium salt. A quaternary ammonium compound may be obtained in the form of a hydrate thereof or may contain solvent of crystallization.

A mixture of resulting isomeric compounds may be separated into the single isomers. For example, a mixture of diastereoisomers or a mixture of geometric cis-trans isomers is separated into the individual racemic compounds on the basis of physico-chemical differences, such as solubility, for example, by fractional crystallization, as well as by fractional distillation. Racemates are resolved into the optically active d and l-forms according to known resolution procedures, for example, by forming a salt of the free racemic base with one of the optically active forms of an acid containing an asymmetric carbon atom. Especially useful as optically active forms of salt-forming acids having an asymmetric carbon atom are D-tartaric and L-tartaric acid, as well as the optically active forms of malic, mandelic, camphor 10-sulfonic or quinic acid. A resulting mixture of salts of the optically active acid with the antipodes of the base racemate is separated into the single salts on the basis of physico-chemical differences, for example, by fractional crystallization. From a resulting salt, the free and optically active base is obtained according to the method described above, and a free and optically active base can be converted into its acid addition salt, N-oxide, salt of an N-oxide or quaternary ammonium compound according to the procedures described above.

The invention also comprises any modification of the process wherein a compound formed as an intermediate at any stage of the process, is used as starting material and the remaining step(s) of the process is (are) carried out, or the process is discontinued at any stage thereof, or the starting materials are formed under the reaction conditions, or the reaction components are used in the form of their salts. The invention further comprises any new intermediates and new starting materials.

In the process of this invention such starting materials are preferably used which lead to final products mentioned in the beginning as preferred embodiments of the invention.

The starting materials are known or, if they are new, may be prepared by methods in themselves known.

The starting materials of the Formula IV, particularly those in which the aryl radical $Ar_0$ is substituted by hydroxyl representing $R_0$ and the salts thereof, such as the metal salts, especially the alkali metal salts, thereof, are new and are intended to be included within the scope of this invention. Apart from serving as starting materials, they exhibit pronounced estrogenic effects and are useful as estrogenic agents. Particularly useful are the starting materials of the Formula VII:

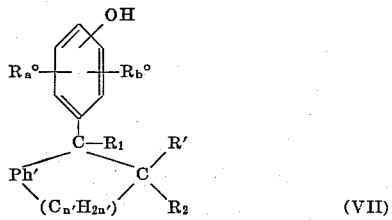

(VII)

in which $Ph'$, $R'$, $R_1$, $R_2$ and the portion $—(C_{n'}H_{2n'})—$ have the previously given meaning, and each of the groups $R_a^°$ and $R_b^°$ is hydrogen halogeno or hydroxyl, and the metal salts, especially the alkali metal salts, thereof. Especially valuable are compounds of the formula VIII:

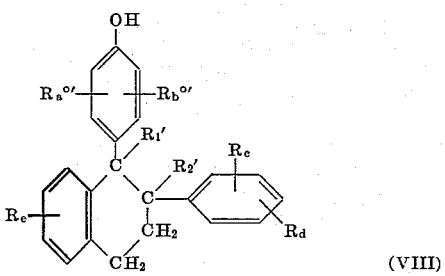

(VIII)

in which $R_1'$, $R_2'$, $R_c$, $R_d$ and $R_e$ have the previously given meaning, and each of the groups $R_a^{°'}$ and $R_b^{°'}$ is hydrogen or hydroxyl, and alkali metal salts thereof.

These starting materials are prepared according to known methods. Thus, a starting material having a group $Ar_0$ substituted by hydroxyl representing $R_0$ may be prepared, for example, by reacting a compound having one of the formulae:

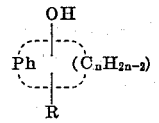

and

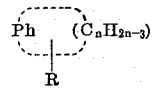

in which Ph, R and $—(C_nH_{2n-2})$ have the previously-given meaning and the portion of the formula $$—(C_nH_{2n-3})—$$

is lower alkenylene forming with Ph a six- or seven-membered ring, one of the ring carbon atoms thereof carries the group R, with a compound of the formula H—$Ar_0$, in which $Ar_0$ has the previously-given meaning, but is preferably a monocyclic carbocyclic aryl radical substituted by hydroxyl, in the presence of a suitable Lewis acid reagent, such as a strong inorganic acid, e.g. sulfuric acid, or a Friedel-Crafts reagent, e.g. aluminum chloride; this reaction is carried out according to known procedures.

The starting material of the Formula IV, in which $Ar_0$ is a monocyclic carbocyclic aryl radical substituted by hydroxyl, is also obtained, for example, by reacting a compound of the formula:

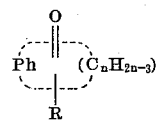

in which Ph and R have the previously-given meaning, and the group of the formula $—(C_nH_{2n-3})—$ represents lower alkylene forming with Ph a six- or seven-membered ring, two of the ring carbon atoms thereof carry the group R and the oxo group, with a reagent of the formula $M^⊕Ar_0'^⊖$, in which $Ar_0'$ is a monocyclic carbocyclic aryl radical substituted by a group capable of being converted into a hydroxyl group, particularly lower alkoxy, e.g. methoxy or ethoxy as well as a benzyloxy group, e.g. benzyloxy, 1-phenylethyloxy, and $M^⊕$ is the cation of certain metals of the IA-group of the Periodic System, e.g. lithium or sodium, or the group of the formula Hal—$Mg^⊕$, in which Hal is halogeno, e.g. chloro, bromo or iodo. In a resulting compound of the formula:

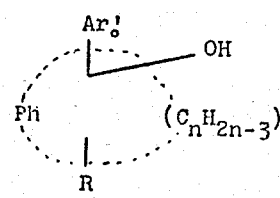

in which Ph, R and $Ar_0'$ have the previously-given meaning, and the portion $—(C_nH_{2n-3})—$ is lower alkylene forming with Ph a six- or seven-membered ring, two of the ring carbon atoms thereof carry the groups R, $Ar_0'$ and the hydroxyl group, whereby $Ar_0'$ and the hydroxyl group substitute the same carbon atom. The hydroxyl group of these compounds may be replaced by hydrogen, for example, by hydrogenolysis, e.g. by hydrogenation in the presence of a suitable catalyst. In a resulting compound, the substituent of the group $Ar_0'$ which is capable of being converted into a hydroxyl group, is so converted, for example, by acid hydrolysis with an aqueous hydrohalic acid, e.g. hydrobromic acid or by hydrogenolysis with hydrogen in the presence of a suitable catalyst, e.g. a palladium catalyst.

Furthermore, in a starting material of the Formula IV, in which the group $Ar_o$ is substituted by hydroxyl, the latter may be converted into the group

—O—C(=O)—Y in which Y has the previously-given meaning, for example, according to any method suitable for the esterification of a phenolic hydroxyl group, such as formation of an alkali metal compound of the phenolic intermediate and reaction of the latter with an ester of the acid of the formula HO—C(=O)—Y or the halide thereof.

In addition, in a resulting starting material of the Formula IV, wherever $R_o$ represents hydroxyl, $R_o$ may be converted into an esterified hydroxy-lower alkoxy group by treating the phenol or a salt thereof with a lower alkylene-oxide, a halogeno-lower alkanol or a lower alkylene halide, in which the two halogen atoms or the halogen atom and hydroxyl group respectively, are separated by at least two carbon atoms, for example, a chloro- or hydroxy-lower alkyl bromide, and if necessary, converting in a resulting compound in which $Ar_o$ is substituted by a hydroxy-lower alkyl-oxy substituent, the hydroxyl group of such substituent into an esterified hydroxyl group, for example, by treatment with a thionyl halide, e.g. thionyl chloride, a phosphorus halide, e.g. phosphorus tribromide, or with an organic sulfonic acid halide, e.g. the chloride, in the presence of a suitable base, e.g. pyridine. The starting material of Formula IV in which $R_o$ stands for carbamyl-lower alkyl-oxy may be prepared from the corresponding carboxy-lower alkyloxy compounds, claimed in co-pending application Ser. No. 481,954, filed August 23, 1965, by conversion into a corresponding acid halide, for example with thionyl chloride, and reacting the halide obtained with ammonia or an amine.

The starting materials of the Formula V are also prepared according to known methods, for example, by reacting compounds of the formulae:

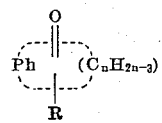

or

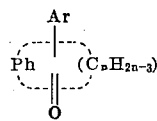

in which Ph, Ar and R have the previously-given meaning, and the portion —$(C_nH_{2n-3})$— is lower alkylene forming with Ph a six- or seven-membered ring, two of the ring carbon atoms carry the group R or Ar and the oxo group, with a Grignard reagent of the formula HalMg$^\oplus$[Ar]$^\ominus$ or HalMg$^\oplus$[R]$^\ominus$ respectively, in which Ar and R have the previously-given meaning, and Hal is halogeno, e.g. chloro or bromo, and carefully decomposing a resulting organic metallic complex.

In a resulting hydroxy-compound of the Formula V, the hydroxyl group may be converted into an esterified hydroxyl group, especially into halogeno, for example, by treatment with a thionyl halide, e.g. thionyl chloride or a phosphorus halide, e.g. phosphorus bromide.

The intermediate used in the above described Grignard reactions for the preparation of the starting materials are known or may be prepared according to known methods; the Grignard reagent may be prepared, for example, according to the "Method of Entrainment," described by Kharash and Reinmuth, Grignard Reactions of Nonmetallic Substances (Prentice-Hall, 1954).

The starting material of the Formula VI may be prepared, for example, by eliminating in the previously-described starting materials of the Formula V, the compound of the formula H—R°, in which R° has the previously-given meaning.

The group R°, which is above all hydroxyl, usually substitutes the carbon atom carrying the group Ar, but may also be attached to the carbon atom carrying the group R. Removal of water by dehydration is achieved, for example, by heating the hydroxy compound, or more preferably, by its treatment with a dehydrating reagent, especially an acidic dehydrating agent, such as an inorganic acid, e.g. hydrochloric, hydrobromic, hydriodic or sulfuric acid, an inorganic acidic dehydrating agent, for example, an acid halide, e.g. thionyl chloride or phosphorus chloride or ammonium chloride as well as an organic acidic dehydrating agent, for example, an acid, e.g. p-ride or p-toluene sulfonyl chloride, an acid anhydride, toluene sulfonic acid, an acid halide, e.g. acetic acid chloride, e.g. acetic acid or propionic acid anhydride or pyridine hydrochloride. If necessary, the reaction is carried out in the presence of a suitable solvent or solvent mixture, preferably at an elevated temperature, in a closed vessel, and/or in the atmosphere of an inert gas, e.g. nitrogen. An esterified hydroxyl group representing R°, such as halogeno, is removed together with hydrogen in the form of the acid, for example, by heating or, if necessary, by treatment with a base.

The compounds of this invention are useful in the form of compositions suitable for enteral, e.g. oral, parenteral or topical use; essentially, they comprise a pharmacologically effective amount of one of the new compounds of this invention in admixture with a pharmaceutically acceptable, organic or inorganic, solid or liquid carrier, which usually represents the major portion by weight of such compositions. These preparations are in solid form, for example, as capsules, tablets or dragees, in liquid form, for example, as solutions or suspensions or in the form of emulsions, e.g. salves or creams. Suitable carrier materials, are, for example, starches, e.g. corn, wheat or rice starch, sugars, e.g. lactose, glucose or sucrose, stearic acid or salts thereof, e.g., magnesium stearate or calcium stearate, stearyl alcohol, talc, gums, acacia, tragacanth, propylene glycol or polyalkylene glycols. The quantity and the nature of the carrier ingredients can vary widely and depend, inter alia, upon the desired physical appearance or size of the composition or method of manufacture. Encapsulation may be effected by using, if desired, the same excipients as those used for tablets. If necessary, the compositions having as the effective pharmacological ingredient one of the compounds of this invention, may contain other auxiliary substances, such as preserving, stabilizing, wetting or emulsifying agents, salts for varying the osmotic pressure or buffers. They may also contain, in combination, other pharmacologically useful substances. The compounding of the formulations is generally carried out in the manner normally employed in the art, i.e. by manufacturing a mixture or a granulate. Any compatible color, approved and certified under the provisions of the Federal Food, Drug and Cosmetic Law may be used for aesthetic purposes or as a means of identification.

The following examples are intended to illustrate the invention and are not to be construed as being limitations thereon. Temperatures are given in degrees centigrade and all parts wherever given are parts by weight.

*Example 1*

To a solution of 2.66 g. of 2-(4-chloro-phenyl)-1-(4-hydroxy-phenyl)-1,2,3,4-tetrahydro-naphthalene in a mixture of 30 ml. of N,N-dimethylformamide and 20 ml. of toluene is added 0.39 g. of a 53 percent suspension of sodium hydride in mineral oil. The resulting mixture is then treated with 1.07 g. of 2-N,N-diethylaminoethyl chloride in 5 ml. of toluene. After stirring at room temperature for twenty hours, the precipitated sodium chloride is filtered off, and the filtrate is concentrated to a volume of about 5 ml. and diluted with water. The organic material is extracted with three portions of diethyl ether; the combined organic extracts are washed with two portions of 2 N aqueous hydrochloric acid. The combined milky aqueous extracts are made basic with a dilute aqueous solution of sodium hydroxide and a dilute aqueous solution of sodium carbonate, and the organic material is extracted with diethyl ether. The organic solution is washed with a concentrated solution of sodium chloride in water, dried over sodium sulfate, and evaporated to yield 3.0 g. of a colorless oil which crystallizes to give the desired 2-(4-chloro-phenyl)-1-[4-(2-N,N-diethylaminoethyl)-oxy-phenyl]-1,2,3,4-tetrahydro-naphthalene of the formula

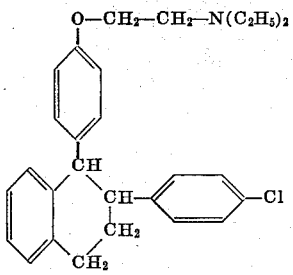

which melts at 81–82° after recrystallizatiton from hexane.

An aqueous solution of the 2-[4-chloro-phenyl)-1-[4-(2-N,N-diethylaminoethyl)-oxy-phenyl]-1,2,3,4 - tetrahydro-naphthalene citrate is obtained by dissolving 0.1 g. of 2-(4-chloro-phenyl)-1-[4-(2-N,N - diethylaminoethyl)-oxy-phenyl]-1,2,3,4-tetrahydro-naphthalene and 0.1 g. of citric acid in 2 ml. of water.

When reacted with a 30 percent solution of hydrogen peroxide, the 2-(4-chloro-phenyl)-1-[4-(2-N,N - diethylaminoethyl)-oxy-phenyl]-1,2,3,4-tetrahydro - naphthalene in methanol yields the 2-(4-chloro-phenyl)-1-[4-(2-N,N-diethylaminoethyl)-oxy-phenyl]-1,2,3,4 - tetrahydro-naphthalene N-oxide; a methanol solution of the latter is reacted with an equivalent amount of picric acid and yields the 2-(4-chloro-phenyl)-1-[4-(2-N,N-diethylaminoethyl)-oxy-phenyl]-1,2,3,4-tetrahydro-naphthalene N-oxide picrate.

A solution of 2-(4-chloro-phenyl)-1-[4-(2-N,N-diethylaminoethyl)-oxy-phenyl]-1,2,3,4 - tetrahydro - naphthalene in acetone is treated with a ten percent excess of methyl iodide to yield the 2-(4-chloro-phenyl)-1-[4-(2-N,N-diethylaminoethyl)-oxy-phenyl]-1,2,3,4 - tetrahydro-naphthalene methiodide.

The starting material used in the above procedure is prepared as follows: To a solution of 167 g. of 4-chlorophenyl-acetonitrile in 1000 ml. of a 1:1-mixture of N,N-dimethylformamide and toluene is added in portions 48 g. of a 53 percent suspension of sodium hydride in mineral oil while stirring and cooling in an ice-bath. After the evolution of hydrogen ceases, a solution of 185 g. of 2-phenylethyl bromide in 200 ml. of toluene is added dropwise; the reaction mixture is stirred at room temperature for five hours and allowed to stand for twenty hours. The solvents are removed under reduced pressure; the oily residue is treated with water and the organic material is extracted with diethylether. The organic solution is washed with acetic acid and a saturated solution of sodium chloride in water, dried over sodium sulfate and evaporated to dryness. The resulting 2-(4-chloro-phenyl)-4-phenyl-butyronitrile is purified by distillation and collected at 202°/0.1 mm.; yield: 183 g.

A solution of 183 g. of 2-(4-chloro-phenyl)-4-phenyl-butyronitrile in 720 ml. of 95 percent ethanol is added to 360 g. of sodium hydroxide in 360 ml. of water, and the mixture is heated under reflux for three days. The major portion of the ethanol is distilled off under reduced pressure, and the aqueous portion is made acidic with dilute hydrochloric acid while cooling in an ice bath. The resulting precipitate is extracted with two portions of diethyl ether and one portion of ethyl acetate; the organic solutions are cleared by filtration through a wet layer of a diatomaceous earth preparation, combined and washed with a saturated aqueous solution of sodium chloride, dried over sodium sulfate and evaporated to dryness. The remaining viscous oil crystallizes from a mixture of hexane and pentane to yield 152 g. of 2-(4-chloro-phenyl)-4-phenyl-butyric acid, M.P. 82–84°.

To a solution of 153 g. of 2-(4-chloro-phenyl)-4-phenyl-butyric acid in 500 ml. of diethyl ether are added 25 drops of pyridine and dropwise 50 ml. of thionyl chloride while stirring and cooling in an ice-bath. The reaction mixture is then refluxed for thirty minutes, and the diethyl ether is stripped off. The residue is diluted with 50 ml. of benzene and the solvent is evaporated under reduced pressure; this procedure to remove the unreacted thionyl chloride is repeated three times.

The residue is then taken up into 500 ml. of benzene and, while stirring and cooling in an ice-bath, the solution is treated dropwise with a mixture of 75 ml. of stannic chloride in 100 ml. of benzene. The reaction mixture is then allowed to warm to room temperature and is stirred for one hour; after cooling, it is treated dropwise with 500 ml. of 2 N hydrochloric acid while stirring. The organic layer is separated and the aqueous phase is extracted twice with ethyl acetate; the organic solutions are combined, washed five times with an aqueous solution of sodium carbonate, and with an aqueous solution of sodium chloride, dried over sodium sulfate and evaporated to dryness. The resulting 2-(4-chloro-phenyl)-1,2,3,4-tetrahydro-naphthalen-1-one is recrystallized from a mixture of benzene and petroleum ether, M.P. 108–109°; yield: 110 g.

A solution of 20.0 g. of 2-(4-chloro-phenyl)-1,2,3,4-tetrahydro-naphthalen-1-one in 50 ml. of tetrahydrofuran is diluted with 50 ml. of ethanol. The clear solution is treated with 2.0 g. of sodium borohydride, which is added in portions, and is then stirred for four hours at room temperature, allowed to stand overnight and again stirred for two hours. After being diluted with aqueous acetic acid and water, the reaction mixture is taken to dryness; the residue is diluted with water, and the organic material is extracted with three portions of ethyl acetate. The organic solution is washed with a concentrated aqueous solution of sodium chloride, dried over sodium sulfate and evaporated. The resulting 2-(4-chloro-phenyl)-1,2,3,4-tetrahydro-naphthalen-1-ol is recrystallized from ethanol, M.P. 132–134°; yield: 10.8 g.

A mixture of 10.4 g. of 2-(4-chloro-phenyl)-1,2,3,4-tetrahydro-naphthalen-1-ol and 4.0 g. of phenol is dissolved in 80 ml. of a 1:1-mixture of benzene and hexane at about 50°, and is added dropwise to a stirred mixture of 8.0 g. of phenol and 2.7 g. of aluminum chloride while cooling with running cold water. After stirring at about 20° for five hours, the reaction mixture is allowed to stand at room temperature for 2½ days and is then poured onto a 1:1-mixture of ice and concentrated hydrochloric acid. The organic material is extracted three times with diethyl ether; the organic extract is washed with water and a saturated aqueous solution of sodium chloride, dried over sodium sulfate and evaporated to dryness.

The residual viscous oil is taken up into 100 ml. of 2 N aqueous sodium hydroxide; the aqueous phase is decanted, and the gummy material is collected. It is suspended in water, and the suspension is made acidic with 2 N aqueous hydrochloric acid. The organic material is extracted with three portions of diethyl ether, the organic solution is washed with a saturated solution of sodium chloride, dried over sodium sulfate and evaporated to yield a viscous oil. The desired 2-(4-chloro-phenyl)-1-(4-hydroxy-phenyl)-1,2,3,4-tetrahydro-naphthalene is obtained by distilling the latter and collecting it at 205–210°/0.1 mm.;

yield: 7.4 g. It crystallizes from a mixture of diethyl ether and pentane and melts at 140–142° after recrystallization from a mixture of diethyl ether, hexane and pentane by evaporating the diethyl ether.

*Example 2*

To a solution of 5.0 g. of 2-phenyl-1-(2,3,4-trihydroxyphenyl)-1,2,3,4-tetrahydro-naphthalene in 30 ml. of N,N-dimethylformamide is added in portions 2.18 g. of a 53 percent suspension of sodium hydride in mineral oil while stirring in an ice bath. The mixture is stirred at room temperature until the evolution of hydrogen ceases, and is then treated with 28.5 ml. of a toluene solution of 2-N,N-diethylaminoethyl chloride (containing 0.216 g. of the base per ml. or a total of 6.15 g. of 2-N,N-diethylaminoethyl chloride). The resulting mixture is stirred for an additional three hours, allowed to stand overnight at room temperature and is then evaporated to dryness under reduced pressure. The residue is diluted with water, and the mixture (pH about 9) is extracted three times with diethyl ether. The combined organic extracts are washed three times with 2 N aqueous hydrochloric acid; the combined aqueous extracts are adjusted to pH 8 with concentrated aqueous ammonia, and extracted three times with diethyl ether. The combined organic extracts are washed with a saturated aqueous solution of sodium chloride, dried over sodium sulfate and evaporated to dryness under reduced pressure to yield 7.0 g. of the crude oily 2-phenyl - 1 - [2,3,4-tri-(2-N,N-diethylaminoethyl) - oxy - phenyl] - 1,2,3,4 - tetrahydro - naphthalene of the formula

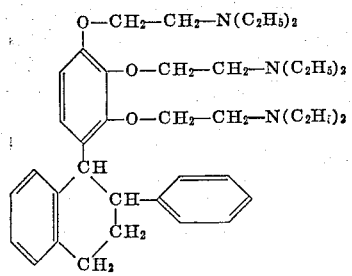

which is purified by chromatography on aluminum oxide (activity III). The desired compound is eluted with a 1:1-mixture of benzene and hexane, with benzene and with benzene containing 20 percent of diethyl ether; a total of 6.0 g. of the pure compound is recovered.

The trihydrochloride of 2-phenyl-1-[2,3,4-tri-(2-N,N-diethylaminoethyl) - oxy - phenyl] - 1,2,3,4 - tetrahydro-naphthalene is obtained by treating a solution of the latter with a solution of hydrogen chloride in ethyl acetate. The starting material used in the above procedure is prepared as follows: To 1.2 ml. of sulfuric acid in 30 ml. of glacial acetic acid is added 12.6 g. of pyrogallol while stirring in an ice bath. The resulting mixture is treated with 22.4 g. of 2-phenyl-1,2,3,4-tetrahydro-naphthalen-1-ol in 45 ml. of acetic acid, which is added dropwise over a period of 45 minutes while keeping the temperature at about 15°. The latter is then allowed to rise to room temperature, whereupon a clear solution results, which is poured into water after standing for 2½ days. The pH is adjusted to 5 with sodium carbonate, and the mixture is extracted three times with diethyl ether. The combined organic extracts are washed with an aqueous solution of sodium hydrogen carbonate, swirled with sodium chloride, dried over sodium sulfate and evaporated to dryness under reduced pressure. The resulting glassy 2-phenyl-1-(2,3,4-trihydroxy-phenyl)-1,2,3,4-tetrahydro-naphthalene crystallizes slowly from hexane and is recrystallized from benzene and hexane, M.P. 161–163°.

A mixture of 1.8 g. of 2-phenyl-1-(2,3,4-trihydroxyphenyl)-1,2,3,4-tetrahydro-naphthalene in 4 ml. of pyridine and 3 ml. of acetic anhydride is allowed to stand at room temperature for twenty hours. The solvent and the reagent are evaporated under reduced pressure; the residue is taken up into benzene and crystallizes upon diluting the solution with hexane. The resulting 2-phenyl-1 - (2,3,4 - triacetyloxy - phenyl) - 1,2,3,4 - tetrahydro-naphthalene melts at 125–126° after recrystallization from a mixture of ethanol and water.

*Example 3*

To a solution of 8.0 g. of 2-(3,4-dichloro-phenyl)-1-(2,3,4 - trihydroxy - phenyl) - 1,2,3,4 - tetrahydro - naphthalene in 40 ml. of N,N-dimethylformamide is added in small portions 2.88 g. of a 53 percent suspension of sodium hydride in mineral oil while stirring and cooling in an ice-bath. After the evolution of hydrogen ceases, 37.6 ml. of a toluene solution of 2-N,N-diethylaminoethyl chloride (containing 0.216 g. of the base per ml. or a total of 8.13 g. of 2-N,N-diethylaminoethyl chloride) is added in a slow stream. The reaction mixture is stirred for three hours and left overnight and again stirred for two hours, all at room temperature, and is then diluted with diethyl ether and filtered. The filtrate is evaporated to dryness under reduced pressure, the residue is diluted with water, and the mixture is extracted three times with ethyl acetate. The combined organic solutions are extracted twice with 2 N aqueous hydrochloric acid, and the combined acidic extracts are treated with a charcoal preparation, filtered and made basic (pH about 8) with concentrated aqueous ammonia. The aqueous solution is again extracted several times with ethyl acetate, the combined organic extracts are swirled with sodium chloride, decanted, dried over sodium sulfate and evaporated to dryness under reduced pressure to yield 9.2 g. of a dark oil which is chromatographed on 360 g. of aluminum oxide (neutral, activity III), using as the starting solvent a 1:1-mixture of hexane and benzene and taking 50 ml. portions. 1.3 g. of oily product A is eluted with benzene, and with benzene containing 20 percent of diethyl ether (fractions No. 18 to 29), 2.7 g. of oily product B with benzene containing 20 percent of diethyl ether (fractions No. 30 to 32), and 2.2 g. of oily product C with benzene containing 20 percent of diethyl ether, with benzene containing 50 percent of diethyl ether, and with diethyl ether (fractions 33 to 52). Product B analyzes correctly for the desired 2-(3,4-dichloro-phenyl)-1 - [2,3,4 - tri - (2 - N,N - diethylaminoethyl) - oxyphenyl]-1,2,3,4-tetrahydro-naphthalene of the formula

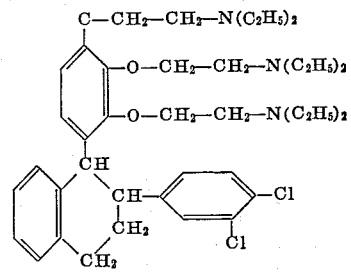

Its trihydrochloride is prepared by reacting a solution of 2 - (3,4 - dichloro - phenyl) - 1 - [2,3,4 - tri - (2 - N,N-diethylaminoethyl) - oxy - phenyl] - 1,2,3,4 - tetrahydro-naphthalene with a solution of hydrogen chloride in ethyl acetate.

The starting material used in the above procedure is prepared as follows: A stirred solution of 64.8 g. of potassium cyanide in 48 ml. of water is refluxed and treated dropwise with 156.4 g. of 2,3,4-trichloro-toluene in 300 ml. of 95 percent of ethanol while heating to gentle reflux. The reaction mixture is refluxed for four hours, then cooled and filtered. The solid material is washed with 95 percent ethanol, and the combined filtrate and washings are evaporated to dryness. Water is added to the residue, and the organic material is extracted with diethyl ether. The organic extract is swirled with solid sodium chloride, decanted, dried over sodium sulfate, filtered and evaporated under reduced pressure. The resulting 3,4-dichloro-phenylacetonitrile is purified by distillation and collected at 165–170°/13 mm., which crystallizes upon refrigeration; yield: 120.4 g.

A solution of 50.0 g. of 3,4-dichloro-phenylacetonitrile in 300 ml. of N,N-dimethylformamide is cooled in an ice-bath and treated with portions of 12.9 g. of a 53 percent sodium hydride suspension in mineral oil. After the vigorous evolution of hydrogen ceases, a solution of 49.7 g. of 2-phenylethyl bromide in 300 ml. of toluene is added in a stream while cooling in an ice-bath. The reaction mixture is stirred for five hours, and allowed to stand overnight at room temperature; after filtering and washing the solid material with benzene and diethyl ether, the combined organic solutions are evaporated to dryness under reduced pressure. The residue is taken up in water, and the organic material is extracted four times with diethyl ether. The organic solution is swirled with sodium chloride, decanted, dried over sodium sulfate, and evaporated under reduced pressure to yield 75.6 g. of a dark-red oil which is distilled. The desired 2-(3,4-dichloro-phenyl)-4-phenyl-butyronitrile is collected at 150–188°/0.08 mm.

A mixture of 53.9 g. of 2-(3,4-dichloro-phenyl)-4-phenyl-butyronitrile, 125 g. of a 50 percent aqueous solution of sodium hydroxide and 185 ml. of ethylene glycol is refluxed for five hours and is then poured into a mixture of ice and water. The mixture is then extracted with diethyl ether and made strongly acidic with concentrated hydrochloric acid. The organic material is extracted with three portions of diethyl ether; the combined organic extracts are swirled with sodium chloride, decanted, dried over sodium sulfate, filtered and evaporated to dryness. The desired 2-(3,4-dichloro-phenyl)-4-phenyl-butyric acid is obtained by distilling the residue and collected at 180–207°/0.08 mm.; yield: 40.0 g.

A solution of 40.0 g. of 2-(3,4-dichloro-phenyl)-4-phenyl-butyric acid in 182 ml. of diethyl ether is refluxed with 6 drops of pyridine and 12 ml. of thionyl chloride for 45 minutes. The solvent is then removed under reduced pressure, and the residue is taken up into 31 ml. of benzene; the solution is again taken to dryness under reduced pressure, and the treatment with benzene is repeated twice. The resulting 2-(3,4-dichloro-phenyl)-4-phenyl-butyric chloride is dissolved in 182 ml. of benzene and treated dropwise with 38.6 g. (17.5 ml.) of stannic chloride in 31 ml. of benzene while stirring and cooling in an ice-bath. The reaction mixture is stirred at room temperature for one hour and then treated dropwise with 62 ml. of a 1:7-mixture of concentrated hydrochloric acid and water. After stirring for thirty minutes, the organic layer is separated, washed with water, twice with a 2 N aqueous solution of sodium carbonate and again with water, and is swirled with sodium chloride; after decanting, the solution is dried over sodium sulfate and evaporated under reduced pressure. The solid residue is suspended in petroleum ether and filtered off to yield the 2 - (3,4 - dichloro-phenyl) - 1,2,3,4 - tetrahydro-naphthalen-1-one, which melts at 100–101° after recrystallization from 95 percent ethanol; yield: 25.7 g.

A stirred solution of 14.6 g. of 2-(3,4-dichloro-phenyl)-1,2,3,4-tetrahydro-naphthalen-1-one in 250 ml. of 95 percent ethanol and 50 ml. of benzene is treated with 2.3 g. of sodium borohydride. The reaction mixture is stirred overnight, evaporated under reduced pressure and the residue is treated with water and with 2 N hydrochloric acid. The aqueous mixture is extracted with three portions of chloroform; the organic solution is swirled with sodium chloride, decanted, dried over sodium sulfate, filtered and evaporated under reduced pressure. The resulting colorless oil crystallizes slowly on standing to yield 12.8 g. of 2-(3,4-dichloro-phenyl)-1,2,3,4-tetrahydro-naphthalen-1-ol, which melts at 96–98° after recrystallization from hexane.

To 10 ml. of acetic acid is added, while stirring and cooling in an ice-bath, 0.4 ml. of concentrated sulfuric acid and then 4.73 g. of pyrogallol. The resulting thick slurry is stirred at about 6° while adding dropwise 11.0 g. of 2-(3,4-dichloro-phenyl)-1,2,3,4-tetrahydro-naphthalen-1-ol in 15 ml. of acetic acid. The reaction mixture is stirred at room temperature for 2½ days and is then poured into water. The pH is adjusted to about 5 with sodium carbonate, and the aqueous mixture is extracted three times with diethyl ether. The combined organic extracts are washed with a dilute sodium hydrogen carbonate solution, swirled with sodium chloride, decanted, dried over sodium sulfate, filtered and evaporated to dryness under reduced pressure to yield 13.9 g. of the sticky yellow 2-(3,4-dichloro-phenyl)-1-(2,3,4-trihydroxy-phenyl)-1,2,3,4-tetrahydro-naphthalene, which does not crystallize and is used without further purification.

*Example 4*

To a solution of 8.04 g. of 2-(4-chloro-phenyl)-1-(4-hydroxy-phenyl)-1,2,3,4-tetrahydro-naphthalene in a mixture of 25 ml. of N,N-dimethylformamide and 15 ml. of toluene is added in portions 2.4 g. of a 53 percent suspension of sodium in mineral oil. After the hydrogen evolution ceases, 2.1 g. of ethylene chlorohydrin in 20 ml. of toluene is slowly added while stirring. The reaction mixture is allowed to stand at room temperature for twenty hours and then filtered; the filtrate is concentrated under reduced pressure to a volume of about 25 ml. and diluted with water. The organic material is extracted with benzene, the organic solution is washed with a saturated aqueous solution of sodium chloride, and a small amount of benzene is distilled off azeotropically to remove traces of water.

The resulting benzene solution of 2-(4-chloro-phenyl)-1-[4-(2-hydroxy - ethyl)-oxy-phenyl] - 1,2,3,4 - tetrahydro-naphthalene is cooled in an ice-bath and treated dropwise with a solution of 5 ml. of thionyl chloride in 25 ml. of benzene. The reaction mixture is allowed to warm to room temperature and is then heated to about 50° until the evolution of hydrogen chloride and sulfur dioxide ceases. The resulting reaction mixture is concentrated under reduced pressure to a volume of about 20 ml., diluted with 50 ml. of benzene and again concentrated to about 30 ml. to remove traces of thionyl chloride.

The resulting benzene solution of 1-[4-(2-chloroethyl)-oxy-phenyl]-2-(4-chloro-phenyl)-1,2,3,4-tetrahydro-naphthalene is treated with 15 ml. of N,N-diethylamine; the reaction mixture is diluted with 50 ml. of benzene and is then heated under reflux for two hours. Upon working up the reaction mixture according to the procedure described in Example 1, the desired 2-(4-chloro-phenyl)-1-[4-(2-N,N-diethylaminoethyl)-oxy-phenyl] - 1,2,3,4-tetrahydro-naphthalene is obtained, which melts at 81–82° after recrystallization from hexane.

*Example 5*

To a solution of 8.4 g. of 2-(4-chloro-phenyl)-1-(4-hydroxy-phenyl)-1,2,3,4-tetrahydro-naphthalene in 50 ml. of N,N-dimethylformamide and 50 ml. of toluene is added 1.2 g. of a 53 percent suspension of sodium hydride in mineral oil while stirring and cooling in an ice-bath. To the resulting solution is added dropwise 3.5 g. of 2-(1-pyrrolidino)-ethyl chloride in 5 ml. of toluene while stirring and cooling at 5°; stirring is continued for six hours at room temperature. The reaction mixture is allowed to stand overnight, and is then diluted with diethyl ether; the solid material is filtered off, and the filtrate is concentrated under reduced pressure to a volume of about 10 ml. and diluted with water. After standing for 2½ days while cooling, the organic material is extracted with three portions of diethyl ether; the organic solution is washed three times with 2 N hydrochloric acid. The organic layer is discarded; the mixture of the combined acidic layers and the precipitate is adjusted to pH 8 by adding an aqueous solution of ammonia and sodium carbonate. The organic material is extracted with ethyl acetate and two portions of diethyl ether; the organic extracts are washed with a saturated aqueous solution of sodium chloride, dried over sodium sulfate and evaporated to dryness to yield 9.6 g. of the viscous 2-(4-chloro-phenyl)-1-{4-[2-(1-pyrrolidino)-ethyl] - oxy-phenyl} - 1,2,3,4-tetrahydronaphthalene of the formula

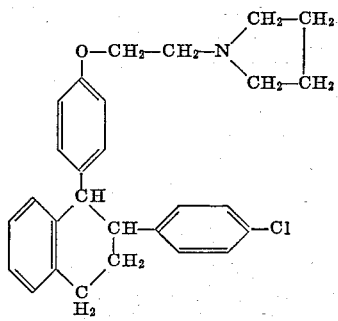

which crystallizes from hexane, M.P. 91–93°.

Example 6

A solution of 6.74 g. of 1-(4-hydroxy-phenyl)-2-phenyl-1,2,3,4-tetrahydro-naphthalene, containing one-half mole of diethyl ether of crystallization, in 50 ml. of N,N-dimethylformamide and 35 ml. of toluene is treated with 0.96 g. of a 53 percent suspension of sodium hydride in mineral oil while stirring and cooling. The resulting cold solution is then treated with 2.7 g. of 2-N,N-diethylaminoethyl chloride in 13.5 ml. of toluene, and after stirring for 20 hours at 30°, the reaction mixture is diluted with diethyl ether. The organic material is filtered off, and the filtrate is concentrated under reduced pressure to a volume of about 20 ml. and diluted with water. The organic material is extracted with three portions of diethyl ether, which are combined and are washed with three portions of 2 N hydrochloric acid. The acidic solutions are made basic (pH about 9) with aqueous ammonia, and are then extracted with three portions of diethyl ether. The organic solutions are combined, washed, dried and evaporated to yield 7.8 g. of the viscous oily 1-[4-(2 - N,N - diethylaminoethyl) - oxy - phenyl]-2-phenyl-1,2,3,4-tetrahydro-naphthalene of the formula

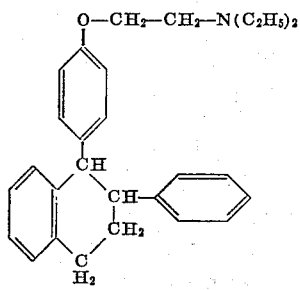

which crystallizes spontaneously, and is recrystallized from a mixture of hexane and petroleum ether. A total of 3.15 g. of a crystalline product is obtained, which is distilled and collected at 205°/0.1 mm., and melts at 57–58°. The mother liquors are taken to dryness to yield 4.5 g. of an oily product, which is dissolved in diethyl ether; the organic solution is treated with a saturated solution of hydrogen chloride in diethyl ether to yield 4.93 g. of the 1-[4-(2 - N,N - diethylaminoethyl) - oxy - phenyl]-2-phenyl - 1,2,3,4 - tetrahydro-naphthalene hydrochloride, which melts at 161–162° after recrystallization from a mixture of acetone, diethyl ether and pentane.

The starting material used in the above procedure is prepared as follows: A mixture of 44.8 g. of 2-phenyl-1,2,3,4-tetrahydro-naphthalen-1-ol and 18.8 g. of phenol in 100 ml. of a 1:1-mixture of benzene and hexane is treated dropwise over a period of two hours with a solution of 13.3 g. of aluminum chloride in 37.6 g. of phenol while stirring and cooling in an ice-bath to 5–10°. The ice-bath is then removed and stirring is continued at room temperature for twelve hours; after standing for sixty hours, the reaction mixture is again stirred for four hours at about 38–40°, and is then poured onto a mixture of 100 g. of ice and 100 ml. of concentrated hydrochloric acid. A total of 50 ml. of diethyl ether is added; the organic layer is separated, and the aqueous mixture is extracted with two additional portions of diethyl ether. The combined ether extracts are washed twice with aqueous solutions of sodium acetate, dried over sodium sulfate, filtered and evaporated to dryness. The excess of phenol is removed by distillation (collected at 75°/13 mm. and a bath temperature of 170°), to leave 66.5 g. of a glassy residue.

The latter is dissolved in the same amount of diethyl ether and poured slowly into 500 ml. of a 10 percent aqueous solution of sodium hydroxide while stirring and keeping it at 50°. The diethyl ether evaporates, and the precipitate is filtered off to yield 66.0 g. of the sodium salt of 1 - (4-hydroxy-phenyl)-2-phenyl-1,2,3,4-tetrahydro-naphthalene, which is suspended in water acidified with 2 N hydrochloric acid. The organic material is extracted with three portions of diethyl ether; the organic solutions are combined, washed with water, an aqueous solution of sodium acetate, and an aqueous solution of sodium chloride, dried over sodium sulfate, and evaporated to dryness, yield: 51.0 g. The resulting 1-(4-hydroxy-phenyl)-2 - phenyl - 1,2,3,4-tetrahydronaphthalene is crystallized from 100 ml. of hexane and about 2 ml. of diethyl ether. A first crop (yield: 20.5 g.) melts at 68–71°, and the second crop (yield: 9.2 g.) melts at 66–70°; a total of 17.3 g. of a glassy residue can be obtained from the mother liquors.

The crystalline material has one-half mole of diethyl ether of crystallization, which is eliminated by distillation and collecting the 1-(4-hydroxy-phenyl)-2-phenyl-1,2,3,4-tetrahydronaphthalene at 186–190°/0.1 mm.

Example 7

A solution of 7.62 g. of the oily 1-(4-hydroxy-phenyl)-2-phenyl-1,2,3,4-tetrahydro-naphthalene (of the fraction weighing 17.3 g., obtained from the mother liquors described in Example 6) in 50 ml. of N,N-dimethylformamide and 25 ml. of toluene is treated with 1.22 g. of a 53 percent suspension of sodium hydride in mineral oil while cooling, and is then treated with 3.45 g. of 2-N,N-diethylaminoethyl chloride in 18 ml. of toluene while cooling. After stirring for twenty hours at room temperature, the reaction mixture is worked up as described in Example 6 to yield 9.1 g. of an oily 1-[4-(2-N,N-diethylaminoethyl) - oxy - phenyl] - 2-phenyl-1,2,3,4-tetrahydronaphthalene, which cannot be crystallized by seeding it with a sample of the product obtained according to the procedure of Example 6. A small sample is converted into the hydrochloride, M.P. 150–153°.

Example 8

To a solution of 1-(4-hydroxy-phenyl)-2-phenyl-1,2,3,4-tetrahydro-naphthalene containing one-half mole of diethyl ether of crystallization in 50 ml. of N,N-dimethylformamide and 50 ml. of toluene is added in three portions a total of 1.2 g. of a 53 percent suspension of sodium hydride in mineral oil while stirring and cooling. After thirty minutes, a clear solution is attained, which is treated dropwise with 3.5 g. of 2-(1-pyrrolidino)-ethyl chloride in 5 ml. of toluene while cooling. The temperature is allowed to rise slowly to room temperature, and the reaction mixture is stirred for an additional six hours. After standing overnight, diethyl ether is added, the inorganic material is filtered off, and the filtrate is evaporated to dryness under reduced pressure. Water is added to the residue; after standing for 2½ days, the organic material is extracted with three portions of diethyl ether. The organic solutions are combined, and washed with three portions of 2 N hydrochloric acid. Three layers are formed; the organic phase is discarded, and the aqueous solution and the percipitate are combined and adjusted to pH 8 with a concentrated aqueous solution of ammonia and sodium carbonate. The organic material is extracted with one portion of ethyl acetate and two portions of diethyl ether; the organic extracts are washed with an aqueous solution of sodium chloride, dried over sodium sulfate and evaporated to dryness under reduced pressure to yield 5.5 g. of the oily 2-phenyl-1-{4-[2 - (1 - pyrrolidino) - ethyl]-oxy-phenyl}-1,2,3,4-tetrahydronaphthalene of the formula:

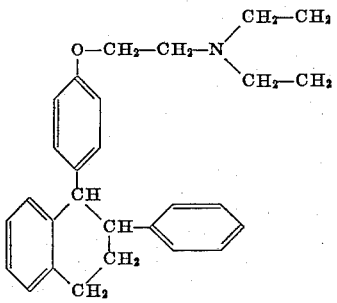

Its hydrochloride is prepared by adding a saturated solution of hydrogen chloride in diethyl ether to a solution of the base in a 5:1-mixture of diethyl ether and acetone; it melts at 190–193°, and is recrystallized from a 1:5:5-mixture of ethanol, acetone and diethyl ether.

*Example 9*

The 2 - (4 - chloro-phenyl)-1-[4-(2-N,N-diethylaminoethyl) - oxy - phenyl]-2-methyl-1,2,3,4-tetrahydro-naphthalene of the formula

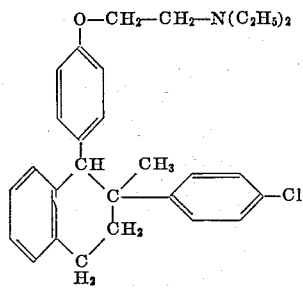

is prepared by reacting a solution of 2-(4-chloro-phenyl)-1 - (4-hydroxy-phenyl)-2-methyl-1,2,3,4-tetrahydro-naphthalene in N,N-dimethylformamide and toluene with 53 percent suspension of sodium hydride in mineral oil, and then with a ten percent excess of 2-N,N-diethylaminoethyl chloride according to the procedure described in Example 5.

The starting material used in the above procedure is prepared as follows: To a solution of 25.6 g. of 2-(4-chloro - phenyl) - 1,2,3,4-tetrahydro-naphthalene-1-one in 100 ml. of N,N-dimethylformamide and 50 ml. of toluene is added in portions a total of 4.8 g. of a 53 percent suspension of sodium hydride in mineral oil while stirring and cooling in an ice-bath. After the hydrogen evolution ceases (i.e. after about two hours), a solution of 15.0 g. of methyl iodide in 50 ml. of toluene is added slowly. After stirring for two hours while cooling in an ice-bath, and five hours at room temperature, the reaction mixture is allowed to stand overnight and is then diluted with an equal amount of diethyl ether. The precipitate is filtered off and washed with ethyl acetate; the combined filtrate and washings are concentrated under reduced pressure to a volume of about 50 ml. and then diluted with water. The organic material is extracted with three portions of diethyl ether; the organic extracts are washed, dried and evaporated to dryness to yield a viscous oil. The desired 2 - (4 - chloro-phenyl)-2-methyl-1,2,3,4-tetrahydro-naphthalene-1-one crystallizes and is recrystallized from petroleum ether, M.P., 52–55°; a sample is distilled and the pure compound, melting at 52–54°, is collected at 130–135°/0.06 mm.

The 2 - (4-chloro-phenyl)-2-methyl-1,2,3,4-tetrahydronaphthalene-1-ol is obtained by reducing the 2-(4-chlorophenyl) - 2 - methyl-1,2,3,4-tetrahydro-naphthalene-1-one with sodium borohydride, and is then condensed with phenol in the presence of aluminum chloride according to the procedure described in Example 1 to yield the desired 2-(4-chloro-phenyl)-1-(4-hydroxy-phenyl)-2-methyl-1,2,3,4-tetrahydro-naphthalene starting material.

*Example 10*

The following compounds are prepared according to the previously-described procedure by selecting the appropriate starting materials and reagents:

| Starting Materials | Reagents | Products |
| --- | --- | --- |
| 1-(4-hydroxy-phenyl)-1-methy -2-phenyl-1,2,3,4-tetrahydro-naphthalene. | Sodium hydride plus 2-N,N-diethylaminoethyl chloride. | 1-[4-(2-N,N-diethylaminoethyl)-oxy-phenyl]-1-methyl-2-phenyl-1,2,3,4-tetrahydro-naphthalene. |
| 1-(4-hydroxy-phenyl)-2-phenyl-1,2,3,4-tetrahydronaphthalene. | Sodium hydride plus 2-N,N-dimethylaminoethyl chloride. | 1-[4-(2-N,N-dimethylaminoethyl)-oxy-phenyl]-2-phenyl-1,2,3,4-tetrahydronaphthalene. |
| Do | Sodium hydride plus N,N-dimethylaminoisopropyl chloride. | 1-[4-(N,N-dimethylaminoisopropyl)-oxy-phenyl]-2-phenyl-1,2,3,4-tetrahydro-naphthalene. |
| Do | Sodium hydride plus 2-(1-piperidino)-ethyl chloride. | 2-phenyl-1-{4-[2-(1-piperidino)-ethyl]-oxy-phenyl}-1,2,3,4-tetrahydro-naphthalene. |
| Do | Sodium hydride plus 2-(4-methyl-1-piperazino)-ethyl chloride. | 1{4-[2-(4-methyl-1-piperazino)-ethyl]-oxy-pheny}-2-phenyl-1,2,3,4-tetrahydro-naphthalene. |
| Do | Sodium hydride plus 2-(4-morpholino)-ethyl chloride. | 1-{4-[2-(4-morpholino)-ethyl]-oxy-phenyl}-2-phenyl-1,2,3,4-tetrahydronaphthalene. |
| 2-(4-chloro-phenyl)-1-(4-hydroxyphenyl)-1,2,3,4-tetrahydronaphthalene. | Sodium hydride plus 3-N,N-dimethylaminopropyl chloride. | 2-(4-chloro-phenyl)-1-[4-(3-N,N-dimethylaminopropyl)-oxy-phenyl]-1,2,3,4-tetrahydro-naphthalene. |
| 2-(4-chloro-phenyl)-1-(4-hydroxyphenyl)-2-methyl-1,2,3,4-tetrahydronaphthalene. | Sodium hydride plus 2-(1-pyrrolidino)-ethyl chloride. | 2-(4-chloro-phenyl)-2-methyl-1-{4-[2-(1-pyrrolidino)-ethyl]-oxy-phenyl}-1,2,3,4-tetrahydronaphthalene |
| 2-(4-chloro-phenyl)-1-(4-hydroxyphenyl)-1,2,3,4-tetrahydronaphthalene. | Sodium hydride plus 2-(1-piperidino)-ethyl chloride. | 2-(4-chloro-phenyl)-1-{4-[2-(1-piperidino)-ethyl]-oxy-phenyl}-1,2,3,4-tetrahydro-naphthalene. |
| 1-(4-hydroxy-phenyl)-2-(4-methylphenyl)-1,2,3,4-tetrahydronaphthalene. | Sodium hydride plus 2-N,N-diethylaminoethyl chloride. | 1-[4-(2-N,N-diethylaminoethyl)-oxy-phenyl]-2-(4-methyl-phenyl)-1,2,3,4-tetrahydro-naphthalene. |
| 2-(4-fluoro-phenyl)-1-(4-hydroxyphenyl)-1,2,3,4-tetrahydronaphthalene. | Sodium hydride plus 2-(1-piperidino)-ethyl chloride. | 2-(4-fluoro-phenyl)-1-{4-[2-(1-piperidino)-ethyl]-oxy-phenyl}-1,2,3,4-tetrahydro-naphthalene. |
| 1-(4-hydroxy-phenyl)-2-(4-methoxyphenyl)-1,2,3,4-tetrahydronaphthalene. | Sodium hydride plus 2-N,N-diethylaminoethyl chloride. | 1-[4-(2-N,N-diethylaminoethyl)-oxy-phenyl]-2-(4-methoxy-phenyl)-1,2,3,4-tetrahydronaphthalene. |
| Do | Sodium hydride plus 2-(1-pyrrolidino)-ethyl chloride. | 2-(4-methoxy-phenyl)-1-{4-[2-(1-pyrrolidino)-ethyl]-oxy-phenyl}-1,2,3,4-tetrahydronaphthalene. |

| Starting Materials | Reagents | Products |
|---|---|---|
| 1-(4-hydroxy-phenyl)-2-(3-pyridyl)-1,2,3,4-tetrahydronaphthalene. | Sodium hydride plus 2-N,N-diethylaminoethyl chloride. | 1-[4-(2-N,N-diethylaminoethyl)-oxy-phenyl]-2-(3-pyridyl)-1,2,3,4-tetrahydronaphthalene. |
| 6-chloro-1-(4-hydroxy-phenyl)-2-phenyl-1,2,3,4-tetrahydronaphthalene. | Sodium hydride plus 2-(4-methyl-1-piperazino)-ethyl chloride. | 6-chloro-1-{4-[2-(4-methyl-1-piperazino)-ethyl]-oxy-phenyl}-2-phenyl-1,2,3,4-tetrahydro-naphthalene. |
| 7-chloro-1-(4-hydroxy-phenyl)-2-phenyl-1,2,3,4-tetrahydronaphthalene. | Sodium hydride plus 2-N,N-diethylaminoethyl chloride. | 7-chloro-1-[4-(2-N,N-diethylaminoethyl)-oxy-phenyl]-2-phenyl-1,2,3,4-tetrahydro-naphthalene. |
| Do | Sodium hydride plus 2-(1-pyrrolidino)-ethyl chloride. | 7-chloro-2-phenyl-1-{4-[2-(1-pyrrolidino)-ethyl]-oxy-phenyl}-1,2,3,4-tetrahydro-naphthalene. |
| 7-chloro-2-(4-chloro-phenyl)-1-(4-hydroxy-phenyl)-1,2,3,4-tetrahydronaphthalene. | Sodium hydride plus 2-N,N-diethylaminoethyl chloride. | 7-chloro-2-(4-chloro-phenyl)-1-[4-(2-N,N-diethylaminoethyl)-oxy-phenyl]-1,2,3,4-tetrahydro-naphthalene. |
| Do | Sodium hydride plus 2-(1-pyrrolidino)-ethyl chloride. | 7-chloro-2-(4-chloro-phenyl)-1-{4-[2-(1-pyrrolidino)-ethyl]-oxy-phenyl}-1,2,3,4-tetrahydro-naphthalene. |
| Do | Sodium hydride plus 3-N,N-diethylaminopropylchloride. | 7-chloro-2-(4-chloro-phenyl)-1-[4-(3-N,N-diethylaminopropyl)-oxy-phenyl]-1,2,3,4-tetrahydro-naphthalene. |
| 1-(4-hydroxy-phenyl)-7-methyl-2-phenyl-1,2,3,4-tetrahydronaphthalene. | Sodium hydride plus 2-N,N-diethylaminoethyl chloride. | 1-[4-(2-N,N-diethylaminoethyl)-oxy-phenyl]-7-methyl-2-phenyl-1,2,3,4-tetrahydro-naphthalene. |
| Do | Sodium hydride plus 2-(1-pyrrolidino)-ethyl chloride. | 7-methyl-2-phenyl-1-{4-[2-(1-pyrrolidino)-ethyl]-oxy-phenyl}-1,2,3,4-tetrahydro-naphthalene. |
| 2-(4-chloro-phenyl)-1-(hydroxyphenyl)-7-methyl-1,2,3,4-tetrahydronaphthalene. | Sodium hydride plus 2-N,N-diethylaminoethyl chloride. | 2-(4-chloro-phenyl)-1-[4-(2-N,N-diethylaminoethyl)-oxy-phenyl]-7-methyl-1,2,3,4-tetrahydro-naphthalene. |
| Do | Sodium hydride plus 2-(1-pyrrolidino)-ethyl chloride. | 2-(4-chloro-phenyl)-7-methyl-1-{4-[2-(1-pyrrolidino)-ethyl]-oxy-phenyl}-1,2,3,4-tetrahydro-naphthalene. |
| 1-(4-hydroxy-phenyl)-6-methoxy-2-phenyl-1,2,3,4-tetrahydronaphthalene. | Sodium hydride plus 2-N,N-diethylaminoethyl chloride. | 1-[4-(2-N,N-diethylaminoethyl)-oxy-phenyl]-6-methoxy-2-phenyl-1,2,3,4-tetrahydro-naphthalene. |
| 1-(4-hydroxy-phenyl)-6-methoxy-2-(4-methoxy-phenyl)-1,2,3,4-tetrahydro-naphthalene. | Sodium hydride plus 2-(1-pyrrolidino)-ethyl chloride. | 6-methoxy-2-(4-methoxyphenyl)-1-{4-[2-(1-pyrrolidino)-ethyl]-oxy-phenyl}-1,2,3,4-tetrahydronaphthalene. |
| 6,7-dimethoxy-1-(4-hydroxy-phenyl)-2-phenyl-1,2,3,4-tetrahydro-naphthalene. | Sodium hydride plus 2-N,N-diethylaminoethyl chloride. | 6,7-dimethoxy-1-[4-(2-N,N-dimethylaminoethyl)-oxyphenyl]-2-phenyl-1,2,3,4-tetrahydro-naphthalene. |
| Do | Sodium hydride plus 2-(1-pyrrolidino)-ethyl chloride. | 6,7-dimethoxy-2-phenyl-1-{4-[2-(1-pyrrolidino)-ethyl]-oxy-phenyl}-1,2,3,4-tetrahydro-naphthalene. |
| 1-(4-hydroxy-phenyl)-6,7-methylenedioxy-2-phenyl-1,2,3,4-tetrahydro-naphthalene. | Sodium hydride plus 2-N,N-diethylaminoethyl chloride. | 1-[4-(2-N,N-dimethylaminoethyl)-oxy-phenyl]-6,7-methylenedioxy-2-phenyl-1,2,3,4-tetrahydro-naphthalene. |
| Do | Sodium hydride plus 2-(1-pyrrolidino)-ethyl chloride. | 6,7-methylenedioxy-2-phenyl-1-{4-[2-(1-pyrrolidino)-ethyl]-oxy-phenyl}-1,2,3,4-tetrahydro-naphthalene. |
| 1-(3-chloro-4-hydroxy-phenyl)-2-phenyl-1,2,3,4-tetrahydro-naphthalene. | Sodium hydride plus 2-N,N-diethylaminoethyl chloride. | 1-[3-chloro-4-(2-N,N-diethylaminoethyl)-oxy-phenyl]-2-phenyl-1,2,3,4-tetrahydro-naphthalene. |
| 1-(3,5-dichloro-4-hydroxy-phenyl)-2-phenyl-1,2,3,4-tetrahydronaphthalene. | Sodium hydride plus 2-N-(1,6-hexyleneimino)-ethyl chloride. | 1-{3,5-dichloro-4-[2-N-(1,6-hexylene-imino)-ethyl]-oxy-phenyl}-2-phenyl-1,2,3,4-tetrahydro-naphthalene. |
| 1-(3,4-dihydroxyphenyl)-2-phenyl-1,2,3,4-tetrahydronaphthalene. | Sodium hydride plus 2-N,N-diethylaminoethyl chloride. | 1-[3,4-di-(2-N,N-diethylaminoethyl)-oxy-phenyl]-2-phenyl-1,2,3,4-tetrahydro-naphthalene. |
| 2-(2-chloro-phenyl)-1-(3,4-dihydroxy-phenyl)-1,2,3,4-tetrahydro-naphthalene. | Sodium hydride plus 2-N,N-diethylaminoethyl chloride. | 2-(2-chloro-phenyl)-1-[3,4-di-(2-N,N-diethylaminoethyl)-oxy-phenyl]-1,2,3,4-tetrahydro-naphthalene. |
| 1-(4-hydroxy-phenyl)-2-phenyl-benzsuberane. | Sodium hydride plus 2-N,N-diethylaminoethyl chloride. | 1-[4-(2-N,N-diethylaminoethyl)-oxy-phenyl]-2-phenyl-benzsuberane. |

Example 11

100 mg. of a 10% palladium on carbon catalyst in 60 ml. of ethyl acetate are saturated with hydrogen at atmospheric pressure. To the suspension 200 mg. of 1-[4-(2 - N,N-diethylaminoethyl)-oxy-phenyl]-2-phenyl-3,4-dihydro-naphthalene hydrochloride are added and hydrogenation at atmospheric pressure is continued until the uptake of hydrogen has stopped. The catalyst is filtered off and the filtrate evaporated under reduced pressure. To the residue aqueous ammonia is added, the mixture is extracted with diethyl ether, the extract dried and evaporated in vacuo. The oily 1 - [4-(2-N,N-diethylaminoethyl)-oxy-phenyl] - 2 - phenyl-1,2,3,4-tetrahydro-naphthalene is distilled and collected at 165° C./2.25 mm.; it seems to be the cis-isomer of the compound obtained according to Example 6.

Example 12

To 200 mg. of a 10% palladium on carbon catalyst, saturated with hydrogen, in 40 ml. of ethanol, a solution of 200 mg. of 6 - methoxy - 1 - [4 - (2 - pyrrolidino-ethyl) - oxy - phenyl] - 2 - phenyl - 3,4 - dihydro - naphthalene hydrochloride in 20 ml. of ethanol is added and hydrogenated at atmospheric pressure until hydrogen uptake ceases. Following hereupon, the procedure shown in Example 11, there is obtained the 6 - methoxy - 1 - [4-(2 - pyrrolidino - ethyl) - oxy - phenyl] - 2 - phenyl-1,2,3,4-tetrahydro-naphthalene of the formula:

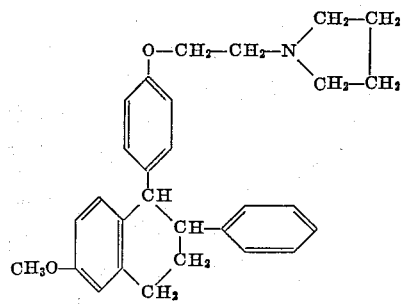

boiling at 180°/1.2 mm.; it is presumably the cis-isomer.

Example 13

500 mg. of 1 - (4 - hydroxy - phenyl) - 2 - phenyl-1,2,3,4-tetrahydro-naphthalene in 5 ml. of N,N-dimethyl formamide and 3.5 ml. of toluene are treated with 71 mg. of a 53% suspension of sodium hydride in mineral oil while stirring and cooling. The resulting cold solution is then treated with 200 mg. of 2-diethylaminoethyl chloride in 1.5 ml. of toluene and stirred for 20 hours at 30°. The reaction mixture is diluted with diethyl ether, inorganic material filtered off and the filtrate concentrated under reduced pressure. The residue is diluted with water, extracted with diethyl ether and the extract shaken with 2 N hydrochloric acid. The acidic solution is made basic with aqueous ammonia, extracted with diethyl ether, the extract washed, dried and evaporated. The remaining oil is distilled and collected at 140°/0.6 mm. According to IR-, UV- and NMR-spectrum the compound obtained is identical with the product obtained according to Example 11.

The starting material is prepared as follows:

1.2 g. of a 10% palladium on carbon catalyst in 100 ml. of ethyl acetate are saturated with hydrogen at atmospheric pressure. To the suspension a solution of 5.4 g. of 1 - (4 - methoxy - phenly) - 2 - phenyl - 3,4 - dihydro-naphthalene in 50 ml. of ethyl acetate is added and allowed to hydrogenate at atmospheric pressure until the hydrogen uptake has stopped. Thereupon the catalyst is filtered off, the filtrate evaporated under reduced pressure, the residue mixed with water and the mixture extracted with diethyl ether. The dried extract is evaporated and the viscous oil obtained recrystallized from 2-propanol to yield pure 1-(4-methoxy-phenyl)-2-phenyl-1,2,3,4-tetrahydro-naphthalene melting at 87–89°.

A solution of 10 ml. of pyridine in 12 ml. of concentrated hydrochloric acid is distilled until the vapors reach a temperature of about 200°. 1 g. of 1-(4-methoxy-phenyl)-2-phenyl-1,2,3,4-tetrahydro-naphthalene is added to the melt of pyridinium chloride and the mixture refluxed for one hour (bath temperature 250°). The cooled reaction mixture is diluted with water, the aqueous phase decanted and the residue taken up in benzene. The organic phase is separated, washed with water, dried and evaporated. The so-obtained 1-(4-hydroxy-phenyl)-2-phenyl-1,2,3,4-tetrahydro-naphthalene melts upon recrystallization from hexane at 142–143°.

*Example 14*

300 mg. of 1-(4-hydroxy-phenyl)-2-(4-chloro-phenyl)-1, 2,3,4-tetrahydro-naphthalene in 3 ml. of N,N-dimethyl formamide and 2.1 ml. of toluene are treated with 43 mg. of a 53% suspension of sodium hydride in mineral oil while stirring and cooling. The resulting cold solution is then treated with 120 mg. of 2-diethylaminoethyl chloride in 1 ml. of toluene and stirred for 20 hours at 30°. The reaction mixture is diluted with diethyl ether, filtered and the filtrate concentrated in vacuo. The residue is mixed with water, the mixture extracted with diethyl ether and the extract shaken with 2 N hydrochloric acid. The aqueous phase is made basic with ammonia, extracted with diethyl ether, the extract washed, dried and evaporated. The remaining oil represents the 1-[4-(2-N,N-diethylamino -ethyl) - oxy - phenyl] - 2 - (4 - chloro - phenyl)-1,2,3,4-tetrahydro-naphthalene, B.P. 305–310°/760 mm.; it seems to be the cis-isomer of the compound obtained according to Example 1.

The starting material is prepared as follows:

To the suspension of 1 g. of a 10% palladium on carbon catalyst (saturated with hydrogen) in 100 ml. of ethyl acetate 2.36 g. of 1-(4-hydroxy-phenyl)-2-(4-chloro-phenyl)-3,4-dihydro-naphthalene (M.P. 143–145°) and 2 drops of concentrated sulphuric acid are added and the mixture is hydrogenated at atmospheric pressure until the uptake of hydrogen ceases. The mixture is filtered, the filtrate evaporated under reduced pressure, the residue diluted with water and the mixture extracted with diethyl ether. The extract is washed with saturated sodium bicarbonate solution, dried and evaporated. The so-obtained 1 - (4 - hydroxy - phenyl) - 2 - (4 - chloro-phenyl)-1,2,3,4-tetrahydro-naphthalene melts after recrystallization from benzene-hexane at 152–154°.

*Example 15*

To a solution of 7.3 g. of 1-(4-hydroxy-phenyl)-2-(3,4-dichlorophenyl) - 1,2,3,4 - tetrahydro-naphthalene in 140 ml. of N,N-dimethylformamide-toluene (1:1) 0.95 g. of a 55% suspension of sodium hydride in mineral oil are added and hereupon 2.68 g. of N,N-diethylaminoethyl chloride. After stirring, at room temperature for about twenty hours the reaction mixture is filtrated and the filtrate concentrated under reduced pressure. The residual solution of about 10 ml. is mixed with water, the mixture extracted with diethyl ether and the extract washed with 2 N-hydrochloric acid. The acidic aqueous solution is made basic with aqueous sodium hydroxide solution, extracted with diethyl ether, the extract washed with a concentrated sodium chloride solution, dried and evaporated. The residue is taken up in diethyl ether, the solution mixed with ethereal hydrochloric acid and the precipitated salt filtrated. There is obtained the 2-(3,4-dichloro-phenyl) - 1 - [4-(2 - N,N - diethylamino-ethyl)oxy-phenyl]-1,2,3,4-tetrahydro-naphthalene hydrochloride of the formula:

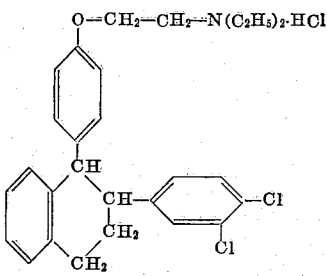

melting at 156–159°.

The starting material can be obtained according to the procedure shown in Example I by reduction of 2-(3,4-dichloro-phenyl) - 1,2,3,4 - tetrahydro - naphthalene-1-one (M.P. 101–102°) with sodium borohydride and condensation of 8.2 g. of the resulting 2-(3,4-dichloro-phenyl)-1,2,3,4-tetrahydro-naphthalene - 1 - ol (M.P. 92–94°) with 2.64 g. of phenol. Said reactants are dissolved in 20 ml. of benzene-hexane (1:1) and the solution added dropwise with stirring and cooling to about 10° to a solution of 1.89 g. of aluminum chloride in 5.3 g. of phenol. The reaction mixture is stirred at room temperature for 8 hours and at 40° for 4 hours and then poured into a 1:1 mixture of ice and concentrated hydrochloric acid. The 1 - (4 - hydroxy - phenyl) - 2-(3,4-dichloro-phenyl)-1,2,3,4-tetrahydro-naphthalene so obtained is extracted into diethyl ether, the extract washed with water dried and evaporated. The residue is distilled and the fraction boiling at 195–210°/0.25 mm. collected.

*Example 16*

To a three necked flask equipped with stirrer and reflux condenser the suspension of 200 ml. of ether and 6.0 g. of lithium aluminum hydride is refluxed for 30 minutes and hereupon the solution of 18.0 g. of 4-(2-phenyl-1,2,3,4 - tetrahydro-naphthyl - 1) - phenoxy-acetyl-ethyl-amide in 100 ml. of ether is added dropwise to the refluxing mixture. After completed addition (30 minutes) heating and refluxing is continued for 5 hours. The excess of the reducing agent is decomposed by dropwise addition of 10 ml. of ethyl-acetate under cooling and stirring, followed by the addition of 100 ml. of water. The aqueous phase is separated, the organic layer filtered, and the ethereal filtrate extracted with three 50 ml. portions of 2 N hydrochloric acid. The acidic extracts are made basic with 40% aqueous sodium hydroxide and the mixture extracted three times with ether. The combined ethereal extracts are washed with water, saturated sodium chloride solution, dried over sodium sulfate, filtered and evaporated to dryness to give the desired 1-[4-(2-N-ethylaminoethyl)-oxy-phenyl] - 2 - phenyl - 1,2,3,4-tetrahydro-naphthalene as a viscous oil. A crystalline citrate thereof is prepared by combining approximately molar methyl-ethyl ketone solutions of the crude base and citric acid at room temperature. The citrate is then filtered and recrystallized from methyl-ethyl ketone and ether.

The starting material can be prepared as follows:

To a solution of 30.0 g. of 1-(4-hydroxy-phenyl)-2-phenyl-1,2,3,4-tetrahydro-naphthalene in 200 ml. of dry xylene 2.3 g. of sodium are added and the mixture is heated to reflux with stirring for 2 hours. At this time all sodium metal is used up and a suspension of the salt is formed. The suspension is allowed to cool to about 50° and a solution of 18.0 g. of ethyl bromoacetate in 50 ml. of xylene is added. Heating and stirring is resumed and the reaction mixture refluxed for 5 hours. Most of the xylene is distilled off under reduced pressure and to the past-like residue 10 ml. of ethanol, 200 ml. of water and 100 ml. of ethylether are added. The organic layer is separated and the aqueous part extracted 2 times with 50 ml. portions of ether. The combined organic layer is washed with water, saturated sodium chloride solution, dried over anhydrous sodium sulfate, filtered and evaporated to dryness.

The residual oil is distilled and the colorless fraction boiling at 190–210°/0.2 mm. collected. The so-obtained 4 - (2 - phenyl - 1,2,3,4-tetrahydro-naphthyl-1)-phenoxy-acetic acid ethyl ester is dissolved in 200 ml. of methanol and a methanolic solution of 7.5 g. of potassium hydroxide in 100 ml. of methanol is added to it. The clear mixture is allowed to stand at room temperature for 48 hours and then evaporated to dryness. To the residue 200 ml. of water are added and the solution acidified with concentrated hydrochloric acid. The product is extracted 3 times with ethylether and the combined extracts washed with water, saturated sodium chloride solution, dried, filtered and evaporated to dryness. The residual oil representing the corresponding free acid is recrystallized from hexane-ether (5:1) to yield a crystalline product.

The acid obtained is dissolved in 100 ml. of diethyl ether, and to the solution 14.0 g. of thionylchloride, diluted with 50 ml. of benzene, are added dropwise. The clear reaction mixture is refluxed for 30 minutes and then evaporated in vacuo. 50 ml. of benzene are added to the residue and again evaporated to dryness. This latter process is repeated 2 times more. The crude acid chloride obtained is dissolved in 100 ml. of toluene, the solution stirred and cooled in an ice bath while gaseous ethylamine is passed through a wide glass tube, first over the vigorously stirred solution for 10 minutes and then under the surface of the reaction mixture until a drop of the reaction mixture showed basic reaction on wet pH paper. Still while cooling and stirring, now 50 ml. of ethylacetate and then 100 ml. of ice water are added. The organic layer is separated, washed 3 times with water, twice with saturated sodium chloride solution, dried over anhydrous sodiumsulfate, filtered and evaporated to dryness. The residue represents the crude 4 - (2 - phenyl - 1,2,3,4 - tetrahydro - naphthalyl - 1)-phenoxy-acetyl-ethylamide, which is recrystallized from benzene-pentane (1:5).

Using in the above process ammonia instead of ethylamine and reducing the obtained acetylamide in the analogous manner as the acetyl-ethylamide, the 1-[4-(2-amino - ethyl) - oxy - phenyl] - 2 - phenyl - 1,2,3,4-tetrahydro-naphthalene is obtained.

Example 17

A solution of 4.3 g. of 1 - [4 - (2 - diethylamino-ethyl)-oxy - phenyl] - 2 - (4 - chloro - phenyl) - 1,2,3,4-tetrahydro-naphthalene and 1.56 of methyl iodide in 100 ml. of acetone is allowed to stand at room temperature for 5 days. Upon removal of the solvent under reduced pressure a crystalline solid is obtained which after recrystallization from ethanol yields the 1-[4-(2-N-methyl-N,N - diethylammonium - ethyl) - oxy - phenyl]-2-(4-chloro-phenyl)-1,2,3,4 - tetrahydro - naphthalene iodide melting at 199–200°.

Example 18

4.3 g. of 1 - [4 - (2 - diethylamino - ethyl) - oxy-phenyl] - 2 - (4 - chloro - phenyl) - 1,2,3,4 - tetrahydro-naphthalene are dissolved in 100 ml. of methanol, 2.3 g. 30% aqueous hydrogen peroxide are added and the mixture is allowed to stand at room temperature for 5 days. Thereupon any excess of hydrogen peroxide is destroyed with a few drops of a manganese sulfate solution and the mixture is evaporated under reduced pressure. The residue is taken up in ethyl acetate, the solution treated with charcoal, filtered and evaporated. The so formed 1 - [4 - (2 - diethylamino - ethyl) - oxy - phenyl]-2-(4-chloro - phenyl) - 1,2,3,4 - tetrahydro - naphthalene-N-oxide remains as an amorphous residue.

Example 19

Preparation of 160,000 tablets each containing 0.06 g. of the active ingredient.

| Ingredients: | G. |
|---|---|
| 1 - [4-(2-diethylamino-ethyl)-oxy-phenyl]-2 - (4-chloro-phenyl)-1,2,3,4-tetrahydro-naphthalene citrate | 9,600.0 |
| Lactose | 22,689.0 |
| Corn starch | 3,410.0 |
| Confectioners sugar | 2,800.0 |
| Colloidal silica | 1,000.0 |
| Stearic acid powder | 400.0 |
| Calcium stearate | 100.0 |
| Color FD & C yellow No. 5 | 1.0 |
| Purified water, q.s. | |

*Procedure.*—The citrate, the lactose, 2,500.0 g. of the corn starch, the confectioners sugar and the colloidal silica are passed through a No. 16 screen into a mixer and blended at low speed for twenty minutes. The remainder of the corn starch is suspended in a cold solution of the color in 1,000 ml. of purified water, and a paste is formed by gradually adding 4,000 ml. of boiling purified water. The mixed powders are granulated with the above paste, using additional water as required.

The resulting moist mass is passed through a mill, using a No. 4A screen, placed on trays and dried at 38° C. until the moisture content is between 2 percent and 3 percent. The granules are broken on a mill through a No. 16 screen, and treated with the stearic acid and the calcium stearate, both screened through a No. 20 screen. After mixing for twenty minutes, the granulation is compressed into tablets, each weighing 0,25 g., using $^{11}\!/_{32}$ inch dies, standard concave punches, uppers bisected, lowers monogrammed.

Example 20

Preparation of 500 capsules each containing 0.04 g. of the active ingredient.

| Ingredients: | G. |
|---|---|
| 1 - [4-(2-diethylamino-ethyl)-oxy-phenyl]-2-phenyl - 1,2,3,4 - tetrahydro-naphthalene hydrochloride | 5,000 |
| Lactose | 75,000 |
| Magnesium stearate | 10,000 |

*Procedure.*—The ingredients are blended in a suitable mixer, sieved through a No. 40 screen and again mixed; portions weighing 0.18 g. each, of the resulting mixture are filled into No. 4 capsules.

Example 21

To the solution of 2.0 g. 1-(4-hydroxy-phenyl)-4-phenyl-1,2,3,4-tetrahydro-naphthalene in 18 ml. dimethylformamide, cooled in an ice bath, 0.32 g. of a 56% suspension of sodium hydride in mineral oil are added in portions and after its dissolution, 0.905 g. 2-chloroethyl-diethylamine in 22 ml. toluene are added dropwise. The mixture is stirred at room temperature for 5 hours, hereupon filtered, the filter residue washed with diethyl ether and the filtrate evaporated in vacuo. The residue obtained is mixed with water, extracted with diethyl ether, the extract washed with 2 N hydrochloric acid, then with water and the aqueous layer separated. It is made basic with aqueous ammonia, extracted with diethyl ether, the extracts washed with concentrated sodium chloride solution, dried, filtered and evaporated. To the residue ethereal hydrochloric acid is added, the crystals formed are filtered off, dried, and recrystallized from ethanol to yield the 1-[4-(2-diethylamino-ethoxy) - phenyl]-4-phenyl - 1,2,3,4-tetrahydro-naphthalene hydrochloride of the formula

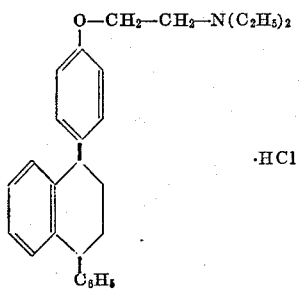

melting at 202–205°.

Example 22

The mixture of 3.0 g. 1-(4-hydroxy-phenyl)-2-phenyl-1,2,3,4-tetrahydro-naphthalene, 1.2 g. diethyl carbonate, 1.2 g. 2-diethylamino-ethanol and 10 mg. anhydrous potassium carbonate is heated to 140° in a flask fitted with a Vigreux-column through which the ethanol formed during the reaction is distilled off within 90 minutes. Thereafter the temperature is raised gradually to 200° and maintained there for one hour. The reaction mixture is dissolved in 50 ml. diethyl ether, the solution washed with water and saturated sodium chloride solution, dried, filtered and evaporated. The residual oil is distilled and the fraction boiling at 205°/0.1 mm. collected; it represents the 1-[4-(2-diethylamino-ethoxy)-phenyl]-2-phenyl-1,2,3,4-tetrahydro-naphthalene which is identical with the product obtained according to Example 6.

Example 23

The solution of 25 g. 1-[4-(2-bromoethoxy)-phenyl]-2-phenyl-1,2,3,4-tetrahydro-naphthalene in 100 ml. 95% ethanol is added to 100 ml. of an ethanolic solution containing 22.0 g. diethylamine and the mixture is heated to 80° in a closed pressure flask for 6 hours. Hereupon it is evaporated in vacuo, to the residue 100 ml. water are added and the mixture is extracted 3 times with diethyl ether. The extract is washed with water, dried and evaporated. The residue obtained is distilled and the fraction boiling at 205°/0.1 mm. collected; it represents the 1-[4-(2-diethylamino-ethoxy)-phenyl]-2-phenyl-1,2,3,4-tetrahydro-naphthalene which is identical with the product according to Example 6.

Example 24

To the solution of 3.6 g. 1-(4-hydroxy-phenyl)-2-phenyl-7-chloro-1,2,3,4-tetrahydro-naphthalene in 35 ml. dimethyl formamide, 0.52 g. of a 56% sodium hydride suspension in mineral oil are added with external cooling. After cessation of the hydrogen evolution 1.46 g. 2-diethylamino-ethyl chloride in 6.55 ml. toluene are added, the mixture is diluted with 35 ml. toluene and stirred at room temperature for 4 hours. It is then filtered, the residue washed with diethyl ether, the filterate is evaporated in vacuo and to the residue water is added. The mixture is extracted with diethyl ether, the extracts shaken with 2 N aqueous hydrochloric acid, the acidic solution extracted with diethyl ether, cooled and made basic with aqueous ammonia. The aqueous mixture is extracted with diethyl ether, the extracts washed with brine, dried, filtered and evaporated. The remaining oil is dissolved in 15 ml. methyl ethyl ketone and the solution combined with the solution of 1.55 g. anhydrous citric acid in methyl ethyl ketone. The crystals formed are separated and recrystallized from acetone diethyl ether to yield the 1-[4-(2-diethylamino-ethoxy)-phenyl]-2-phenyl-7-chloro-1,2,3,4-tetrahydro-naphthalene citrate melting at 98–100°.

Example 25

To the stirred solution of 1.0 g. 1-(4-hydroxy-phenyl)-2-phenyl-7-methyl-1,2,3,4-tetrahydro-naphthalene in 10 ml. dimethyl formamide, cooled in an ice bath, 0.153 g. of a 56% suspension of sodium hydride in mineral oil are added and after cessation of the hydrogen evolution 0.432 g. 2-diethylamino-ethyl chloride in 10 ml. toluene are added and stirring is continued at room temperature for 4 hours. The mixture is filtered, the filtrate evaporated in vacuo, the residue mixed with water and extracted with diethyl ether. The ethereal layer is shaken with 2 N aqueous hydrochloric acid, the acidic solution made basic with aqueous ammonia and again extracted with diethyl ether. The extract is swirled with brine, dried and evaporated. The residual oil is dissolved in diethyl ether, the solution cooled and combined with a solution of hydrogen chloride in ether. The precipitate formed is recrystallized from acetone-diethyl ether to yield the 1-[4-(2-diethylamino-ethoxy) - phenyl] - 2 - phenyl-7-methyl - 1,2,3,4 - tetrahydro - naphthalene hydrochloride melting at 110–112°.

Example 26

The suspension of 1.0 g. lithium aluminum hydride in 50 ml. diethyl ether is refluxed and stirred for 30 minutes. Hereupon 4.0 g. 1-(4-carbamylmethoxy-phenyl)-2-(4-chloro-phenyl)-1,2,3,4-tetrahydro-naphthalene in 25 ml. tetrahydrofuran and 25 ml. diethyl ether are added in 2 ml. portions and after the addition the mixture is refluxed and stirred for 24 hours. Hereupon wet diethyl ether, water and 2 N hydrochloric acid are added in this order and the organic solvents are removed in vacuo. The residual aqueous solution is made basic with 10% aqueous potassium hydroxide, extracted with diethyl ether-benzene-1:1, the extracts are washed with water, dried and evaporated. The residue is dissolved in diethyl ether, the solution combined with a solution of 1.35 g. anhydrous citric acid in 15 ml. methyl ethyl ketone. This mixture is evaporated under reduced pressure, to the residue hexane is added, the mixture is homogenized and allowed to stand overnight. The crystalline residue is filtered off to yield the 1-[4-(2-amino-ethoxy)-phenyl]-2-(4-chloro-phenyl)-1,2,3,4-tetrahydro - naphthalene citrate monohydrate melting at 95–102°.

The starting material is prepared as follows: The mixture of 12.0 g. 1-(4-carboxymethoxy-phenyl)-2-(4-chloro-phenyl)-1,2,3,4-tetrahydro-naphthalene and 50 ml. thionyl chloride is refluxed for 40 minutes and then evaporated in vacuo. From the residue 2 times 20 ml. benzene are distilled off. The residual viscous oil is dissolved in 100 ml. diethyl ether, the solution divided into two equal portions to which dropwise, under cooling and stirring, an excessive amount of a saturated ethereal solution of ammonia (A) and ethylamine (B) are added. Reaction mixture A is evaporated to dryness, the residue dissolved in chloroform, the solution washed with water, dried and evaporated to yield the 1-(4-carbamylmethoxy-phenyl)-2-(4-chloro-phenyl)-1,2,3,4-tetrahydro-naphthalene which is first recrystallized from a mixture of hexane, diethyl ether and benzene and finally from aqueous ethanol; M.P. 119–120°.

Reaction mixture B is evaporated, the residue dissolved in diethyl ether-ethyl acetate, washed with water, dried and evaporated. The residue is recrystallized first from hexane and then from aqueous ethanol to yield the 1 - (4 - N - ethyl - carbamylmethoxy - phenyl) - 2 - (4-chloro - phenyl) - 1,2,3,4 - tetrahydro-naphthalene melting at 107–108°; this compound is used as starting material in Example 27.

Example 27

The suspension of 1.0 g. lithium aluminum hydride and 50 ml. diethyl ether is refluxed for ½ an hour with stirring. Hereupon the solution of 4.0 g. 1-(4-N-ethyl-carbamylmethoxy - phenyl) - 2 - (4 - chloro - phenyl) - 1, 2,3,4 - tetrahydro - naphthalene in 50 ml. diethyl ether and 25 ml. tetrahydrofuran is added in portions and after the addition the mixture is stirred and refluxed for 30 hours. The excess hydride is destroyed by addition of moist diethyl ether, water and 2 N hydrochloric acid in this order and hereupon the organic solvents are distilled off in vacuo. The residual solution is made basic with 10% aqueous potassium hydroxide and extracted with diethyl ether-benzene. The extract is washed with water, dried and evaporated. The residue is taken up in diethyl ether and the solution acidified with ethereal hydrochloric acid. The precipitate formed is filtered off and recrystallized from acetone to yield the 1-[4-(2-ethylamino - ethoxy) - phenyl] - 2 - (4 - chloro - phenyl) - 1, 2,3,4 - tetrahydro-naphthalene hydrochloride melting at 187–189°.

*Example 28*

To the solution of 1.5 g. 1-(4-hydroxy-phenyl)-2-(4-chloro-phenyl)-benzosuberane in 10 ml. dimethylformamide, 0.18 g. of a 56% sodium hydride suspension in mineral oil are added with stirring and cooling. After cessation of the hydrogen evolution 0.51 g. 2-diethylamino-ethyl chloride in 2.24 ml. toluene are added and the mixture is further diluted with 10 ml. toluene. It is stirred at room temperature for 4 hours and is allowed to stand overnight. Hereupon it is filtered, the filtrate evaporated in vacuo, the residue mixed with water and extracted with diethyl ether. The extract is shaken with 2 N aqueous hydrochloric acid, the acidic solution made basic with aqueous ammonia, extracted with diethyl ether, the extracts washed with water and brine, dried, filtered and evaporated in vacuo. The residue is taken up in methyl ethyl ketone and the solution combined with that of 1.0 g. anhydrous citric acid in methyl ethyl ketone. The precipitate formed is filtered off and recrystallized from acetone-diethyl ether to yield the 1-[4-(2-diethylamino - ethoxy) - phenyl] - 2 - (4 - chloro - phenyl) - benzosuberane citrate of the formula

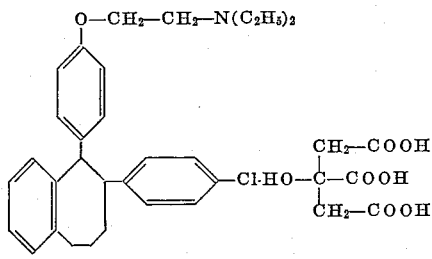

melting at 107–109°.

*Example 29*

To the solution of 2.0 g. 1-(4-hydroxy-phenyl)-2-(2-fluoro-phenyl)-1,2,3,4-tetrahydro-naphthalene in 18 ml. dimethylformamide, 0.3 g. of a 56% suspension of sodium hydride in mineral oil are added and when no more hydrogen is generated, 0.855 g. 2-diethylamino-ethyl chloride in 50 ml. toluene are added with stirring and the mixture is kept for 3 hours at room temperature. Hereupon it is filtered, the filtrate evaporated in vacuo, the residue suspended in water and extracted with diethyl ether. The extract is shaken with 2 N hydrochloric acid, the aqueous layer made basic with ammonia and extracted with diethyl ether. The extract is washed with water, dried, filtered and evaporated, the residue is dissolved in methyl ethyl ketone and the solution combined with that of 1.4 g. citric acid in methyl ethyl ketone. After addition of diethyl ether a precipitate is formed which is recrystallized from acetone-diethyl ether to yield the 1 - [4 - (2 - diethylamino - ethoxy) - phenyl] - 2 - (2 - fluoro - phenyl) - 1,2,3,4 - tetrahydro - naphthalene citrate melting at 100–102°.

*Example 30*

To the solution of 2.0 g. 1-(4-hydroxy phenyl)-2-(4-methoxy-phenyl)-1,2,3,4-tetrahydro-naphthalene in 18 ml. dimethyl formamide, 0.295 g. of a 53% suspension of sodium hydride in mineral oil are added while cooling and stirring, followed by a solution of 0.82 g. 2-diethyl-amino-ethyl chloride in 20 ml. toluene and the mixture is stirred for 3½ hours at room temperature. Hereupon it is filtered, the filtrate evaporated under reduced pressure, the residue combined with water and extracted with diethyl ether. The extract is shaken with 2 N aqueous hydrochloric acid, the aqueous layer made basic with ammonia and extracted with diethyl ether. The extract is swirled with brine, dried and evaporated under reduced pressure. The residue is dissolved in methyl ethyl ketone and the solution acidified with a solution of citric acid in methyl ethyl ketone. After cooling the crystals are filtered off and recrystallized from acetone to yield the 1 - [4 - (2 - diethylamino - ethoxy) - phenyl] - 2 - (4 - methoxy-phenyl)-1,2,3,4-tetrahydro-naphthalene citrate melting at 108–111°.

The starting material is prepared as follows:

The mixture of 22.2 g. 1-hydroxy-2-(4-methoxy-phenyl)-1,2,3,4-tetrahydro-naphthalene, 4.7 g. phenol, 256 ml. benzene and 83.5 ml. hexane is added dropwise to a solution of 5.95 g. aluminum chloride in 17.5 g. phenol, with stirring and cooling in an ice bath. After completed addition the reaction mixture is stirred at room temperature for 5 hours and finally heated a few minutes to 50°. It is then poured onto 150 g. ice and 150 ml. concentrated hydrochloric acid, extracted with diethyl ether, the extracts washed with water, dried, filtered and evaporated in vacuo. The semicrystalline residue is swirled with cold pentane and filtered. The filtrate is evaporated and the gummy solid formed is swirled with diethyl ether and filtered off. The filtrate is evaporated and the residue recrystallized from aqueous ethanol. All of the preceeding crystalline material is discarded. The ethanolic solution is evaporated and the residue recrystallized from benzene pentane to yield the desired 1- (4 - hydroxy - phenyl) - 2 - (4 - methoxy - phenyl)- 1,2,3,4-tetrahydro-naphthalene melting at 154–156°.

*Example 31*

To the solution of 2.8 g. 1-(4-hydroxy-phenyl)-2-(4-chloro - phenyl) - 6 - methoxy - 1,2,3,4 - tetrahydro-naphthalene in 23 ml. dimethylformamide, 0.367 g. of a 56% suspension of sodium hydride in mineral oil are added while cooling and stirring. After cessation of the hydrogen evolution 1.04 g. 2-diethylamino-ethyl chloride in 28 ml. toluene are added and the reaction is stirred at room temperature four hours. Hereupon it is filtered, the residue washed with diethyl ether and the filtrate evaporated in vacuo. The residue is swirled with water, extracted with diethyl ether, the extract shaken with 2 N hydrochloric acid and the aqueous solution made basic with aqueous ammonia. It is extracted with diethyl ether-ethyl acetate 1:1. The extract is washed with water and brine, dried, filtered and evaporated under reduced pressure. The residue is dissolved in diethyl ether and the solution acidified with etheral hydrochloric acid. The crystals formed are filtered off and recrystallized from acetone-diethyl ether to yield the 1-[4-(2-diethylamino-ethoxy) - phenyl] - 2 - (4 - chloro - phenyl) - 6 - methoxy-1,2,3,4-tetrahydro-naphthalene hydrochloride melting at 217–219°.

What is claimed is:

1. A member selected from the group consisting of a compound having the formula

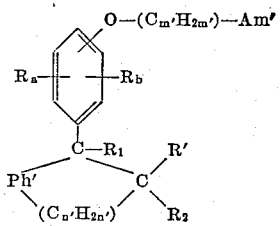

in which Ph' is a member selected from the group consisting of 1,2-phenylene, (lower alkyl)-1,2-phenylene, (lower alkoxy)-1,2-phenylene and (halogeno)-1,2-phenylene, R' is a member selected from the group consisting of phenyl, (lower alkyl)-phenyl, (lower alkoxy)-phenyl and (halogeno)-phenyl, each of the groups $R_1$ and $R_2$ is a member selected from the group consisting of hydrogen, methyl and ethyl, the portion —$(C_{n'}H_{2n'})$— stands for alkylene having from two to three carbon atoms and separating the groups Ph' from the carbon atom carrying the groups R' and $R_2$ by two to three carbon atoms, Am' is a member selected from the group consisting of amino, lower alkyl-amino, di-lower alkyl-amino, alkylene-imino, in which alkylene has from four to seven carbon atoms, 4-morpholino and 4-lower alkyl-piperazino, the portion —$(C_{m'}H_{2m'})$— stands for alkylene having from two to three carbon atoms and separating the group Am' from the oxygen atom by two to three carbon atoms, and each of the groups $R_a$ and $R_b$ is a member selected from the group consisting of hydrogen and halogeno, an N-oxide, a quaternary ammonium salt and an acid addition salt thereof.

2. A compound as claimed in claim 1 and being a member selected from the group consisting of a compound having the formula:

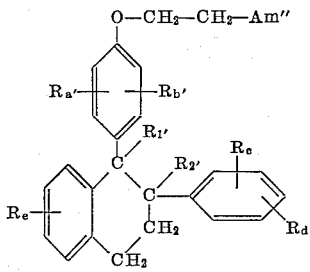

in which Am'' is a member selected from the group consisting of N,N-di-lower alkyl-amino and N,N-alkylene-imino, in which alkylene has from four to seven carbon atoms, one of the groups $R_1'$ and $R_2'$ is a member selected from the group consisting of hydrogen and methyl, and the other is hydrogen, each of the groups $R_a'$ and $R_b'$ is a member selected from the group consisting of hydrogen and halogeno and each of the groups $R_c$, $R_d$ and $R_e$ is a member selected from the group consisting of hydrogen, lower alkyl, lower alkoxy and halogeno, and an acid addition salt thereof.

3. A compound as claimed in claim 1 and being a member selected from the group consisting of a compound having the formula

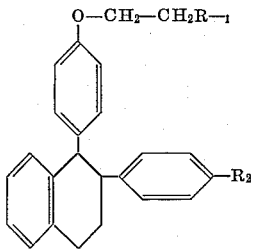

in which $R_1$ stands for a member selected from the group consisting of diethylamino and pyrrolidino and $R_2$ for a member selected from the group consisting of hydrogen and chloro, and an acid addition salt thereof.

4. A compound as claimed in claim 1 and being a member selected from the group consisting of 1-[4-(2-diethylamino - ethoxy) - phenyl] - 2 - (4 - chlorophenyl)-1,2,3,4-tetrahydronaphthalene and an acid addition salt thereof.

5. A compound as claimed in claim 1 and being a member selected from the group consisting of 1-[4-(2-pyrrolidino - ethoxy) - phenyl] - 2 - phenyl - 6 - methoxy-1,2,3,4-tetrahydronaphthalene and an acid addition salt thereof.

6. A compound as claimed in claim 1 and being a member selected from the group consisting of 1-[4-(2-diethylamino-ethoxy) - phenyl] - 2 - (3,4 - dichlorophenyl)-1,2,3,4-tetrahydronaphthalene and an acid addition salt thereof.

7. A compound as claimed in claim 1 and being a member selected from the group consisting of 1-[4-(2-diethylamino - ethoxy) - phenyl] - 2 - phenyl - 1,2,3,4-tetrahydronaphthalene and an acid addition salt thereof.

8. A compound as claimed in claim 1 and being a member selected from the group consisting of 1-[4-(2-diethylamino - ethoxy) - phenyl] - 2 - phenyl - 7 - chloro-1,2,3,4-tetrahydronaphthalene and an acid addition salt thereof.

9. A compound as claimed in claim 1 and being a member selected from the group consisting of 1-[4-(2-diethylamino - ethoxy) - phenyl] - 2 - phenyl - 7 - methyl-1,2,3,4-tetrahydronaphthalene and an acid addition salt thereof.

10. A compound as claimed in claim 1 and being a member selected from the group consisting of 1-[4-(2-diethylamino - ethoxy) - phenyl] - 2 - (4 - chloro-phenyl)-benzosuberane and an acid addition salt thereof.

11. A compound as claimed in claim 1 and being a member selected from the group consisting of 1-[4-(2-diethylamino - ethoxy) - phenyl] - 2 - (2 - fluoro-phenyl)-1,2,3,4-tetrahydronaphthalene and an acid addition salt thereof.

12. A compound as claimed in claim 1 and being a member selected from the group consisting of 1-[4-(2-diethylamino - ethoxy) - 2 - (4 - methoxy - phenyl)-1,2,3,4-tetrahydronaphthalene and an acid addition salt thereof.

13. A compound as claimed in claim 1 and being a member selected from the group consisting of 1-[4-(2-diethylamino - ethoxy) - phenyl] - 2 - (4 - chloro-phenyl)-6-methoxy-1,2,3,4-tetrahydronaphthalene and an acid addition salt thereof.

No references cited.

ALEX MAZEL, *Primary Examiner.*

HENRY R. JILES, *Examiner.*

JOSE TOVAR, *Assistant Examiner.*